(12) United States Patent
Lee et al.

(10) Patent No.: US 12,526,859 B2
(45) Date of Patent: Jan. 13, 2026

(54) METHOD FOR MANAGING WIRELESS CONNECTION OF ELECTRONIC DEVICE, AND APPARATUS THEREFOR

(71) Applicant: SAMSUNG ELECTRONICS CO., LTD., Suwon-si (KR)

(72) Inventors: Seungcheol Lee, Suwon-si (KR);
Moohyun Shin, Suwon-si (KR);
Sungjun Yi, Suwon-si (KR);
Seungtaek Chung, Suwon-si (KR);
Jinhong Jeong, Suwon-si (KR);
Seungyoun Ju, Suwon-si (KR);
Daeyoung Jeong, Suwon-si (KR);
Suengyoon Joung, Suwon-si (KR);
Kyoungho Choi, Suwon-si (KR);
Dongeup Ham, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 352 days.

(21) Appl. No.: 18/106,829

(22) Filed: Feb. 7, 2023

(65) Prior Publication Data
US 2023/0189360 A1    Jun. 15, 2023

Related U.S. Application Data

(63) Continuation of application No. PCT/KR2021/009306, filed on Jul. 20, 2021.

(30) Foreign Application Priority Data

Aug. 7, 2020  (KR) .................. 10-2020-0099445
Nov. 30, 2020  (KR) .................. 10-2020-0165087

(51) Int. Cl.
*H04W 8/00*    (2009.01)
*H04W 76/14*    (2018.01)

(52) U.S. Cl.
CPC ........... *H04W 76/14* (2018.02); *H04W 8/005* (2013.01)

(58) Field of Classification Search
CPC ................................ H04W 76/14; H04W 8/00
See application file for complete search history.

(56) References Cited

U.S. PATENT DOCUMENTS 7,218,644 B1    5/2007  Heinonen et al.
9,974,048 B2 *  5/2018  Yang ................. H04W 36/0066
(Continued)

FOREIGN PATENT DOCUMENTS

CN    110996305 A    4/2020
KR    1020140025736 A    3/2014
(Continued)

OTHER PUBLICATIONS

Written Opinion (PCT/ISA/237) issued Nov. 8, 2021 by the International Searching Authority in International Application No. PCT/KR2021/009306.
(Continued)

*Primary Examiner* — Tuan H Nguyen
(74) *Attorney, Agent, or Firm* — Sughrue Mion, PLLC

(57) ABSTRACT

A method for managing a wireless connection of an electronic device, and apparatus for supporting same are provided. The electronic device may comprise a communication circuit, at least one processor, and a memory. The at least one processor is configured to: based on detection of a first event associated with an external device, identify first information relating to Bluetooth usage of the electronic device and second information relating to a wireless network resource state; determine a number of connectable devices, based on the first information and the second information; identify state information of one or more external devices registered in the electronic device; determine a priority of (Continued)

the one or more external devices, based on the state information; determine at least one external device, from among the one or more external devices, as a device to be connected, based on the number of connectable devices and the priority; and control the communication circuit to connect a channel with the at least one external device determined as the device to be connected.

15 Claims, 16 Drawing Sheets

(56) References Cited

U.S. PATENT DOCUMENTS

| | | | |
|---|---|---|---|
| 10,237,193 B2 | 3/2019 | Chen et al. |
| 10,349,457 B1 | 7/2019 | Oh et al. |
| 2013/0260690 A1 | 10/2013 | Cha |
| 2014/0073244 A1 | 3/2014 | Ko et al. |
| 2015/0245186 A1 | 8/2015 | Park et al. |
| 2015/0334706 A1 | 11/2015 | Mukherjee |
| 2016/0105924 A1 | 4/2016 | Baek et al. |
| 2016/0119745 A1 | 4/2016 | Choi |
| 2016/0174021 A1 | 6/2016 | Lim et al. |
| 2017/0093727 A1 | 3/2017 | Chen et al. |
| 2018/0255598 A1 | 9/2018 | An |
| 2018/0279050 A1 | 9/2018 | Ryu |

FOREIGN PATENT DOCUMENTS

| | | |
|---|---|---|
| KR | 1020140033677 A | 3/2014 |
| KR | 1020150099885 A | 9/2015 |
| KR | 1020160042569 A | 4/2016 |
| KR | 10-2016-0073242 A | 6/2016 |
| KR | 1020180108310 A | 10/2018 |
| KR | 101949373 B1 | 2/2019 |
| KR | 102001366 B1 | 7/2019 |
| KR | 102252633 B1 | 5/2021 |
| WO | 2014/175990 A1 | 10/2014 |

OTHER PUBLICATIONS

International Search Report (PCT/ISA/210) issued Nov. 8, 2021 by the International Searching Authority in International Application No. PCT/KR2021/009306.

Communication issued on Dec. 22, 2023 by the European Patent Office in European Patent Application No. 21853075.6.

Communication issued Oct. 1, 2025 by the Korean Intellectual Property Office in Korean Patent Application No. 10-2020-0165087.

* cited by examiner

METHOD FOR MANAGING WIRELESS CONNECTION OF ELECTRONIC DEVICE, AND APPARATUS THEREFOR

CROSS-REFERENCE TO RELATED APPLICATIONS

This application is a by-pass continuation of International Application No. PCT/KR2021/009306, filed on Jul. 20, 2021, which is based on and claims priority to Korean Patent Application No. 10-2020-0099445, filed on Aug. 7, 2020, and Korean Patent Application No. 10-2020-0165087, filed on Nov. 30, 2020, in the Korean Intellectual Property Office, the disclosures of which are incorporated by reference herein in their entireties.

BACKGROUND

1. Field

Various embodiments disclosed herein relate to a technology for configuring and managing wireless connection of an electronic device.

2. Description of Related Art

With the increase of supply of various electronic devices, users are using not only a mobile communication device, such as a smartphone, but also many electronic devices, such as a smart watch, earphones, and a tablet, which are usable by connecting to the smartphone. Small electronic devices like earphones or earbuds have the risk of loss due to a user's carelessness. A manufacturer or a service provider may provide a service for identifying the location of an electronic device in case of loss.

When a predetermined time has passed after a disconnection from a mother terminal, an electronic device may broadcast a signal including identification information to announce its presence. Neighboring mobile devices having scanned for the signal registers positioning information on the electronic device in a predetermined server, and the predetermined server shares the positioning information with a mother terminal registered with the same account as that of the electronic device, whereby a location identification service for the electronic device may be provided. However, in a case where a mother terminal interworks with multiple electronic devices, the mother terminal may fail to maintain a connection with some electronic devices due to limited available resources in a system thereof. In this case, an electronic device disconnected from the mother terminal for a predetermined time or longer may continuously broadcast a signal including its identification information even when the electronic device has not actually been lost, and thus cause unnecessary battery consumption and communication load.

In a case where multiple devices (e.g., a smart watch, a tablet, and wireless earphones) are registered in a mobile electronic device, the limitation of system resources makes it hard to maintain a wireless network connection with all the devices. For example, when a mobile electronic device attempts to connect to registered devices with no consideration of system resources, performance of functions provided in the mobile electronic device may degrade like Bluetooth connection failure or data transmission/reception speed reduction. In addition, in a case of devices having a state transitioning according to a time having passed after disconnection from a mobile electronic device (e.g., a mother terminal), it is necessary to manage the device not to recognize itself as having been lost for too long for maintenance of device performance.

SUMMARY

Provided is an electronic device which determines the number of neighboring devices to be connected in consideration of wireless network connection congestion and system resources, and determines a neighboring device to be connected according to priority determined based on the state of the neighboring devices.

According to an aspect of the disclosure, an electronic device includes: a communication circuit; a memory storing instructions; and at least one processor operatively connected to the memory and the communication circuit, the at least one processor being configured to execute the instructions to: based on detection of a first event associated with an external device, identify first information relating to Bluetooth usage of the electronic device and second information relating to a wireless network resource state; determine a number of connectable devices, based on the first information and the second information; identify state information of one or more external devices registered in the electronic device; determine a priority of the one or more external devices, based on the state information; determine at least one external device, from among the one or more external devices, as a device to be connected, based on the number of connectable devices and the priority; and control the communication circuit to connect a channel with the at least one external device determined as the device to be connected.

The at least one processor may be further configured to execute the instructions to: control the communication circuit to transmit control information on the at least one external device through the connected channel; and control the communication circuit to transmit connection state information on the one or more external devices to a server according to a designated time period.

The first information may include at least one of a number of devices paired with the electronic device, a profile usage state, a connection state, or an operation activation state, and the second information may include at least one of a data usage amount measured in the electronic device, or a network function activation state.

The first event may include at least one of state change, plugin detection, or a designated operation performing of the external device.

The at least one processor may be further configured to execute the instructions to register the one or more external devices, based on at least one of a connection request received in the electronic device or a packet received every designated period.

The electronic device may further include a display, the at least one processor may be further configured to execute the instructions to: scan for a packet broadcast from the external device according to a first period while the display is turned on; and scan for a packet broadcast from the external device according to a second period while the display is turned off, and the first period may be a time unit that is smaller than the second period.

The at least one processor may be further configured to execute the instructions to, based on the state information of the one or more external devices being identical, determine the priority, based on at least one of a subject of registration in the electronic device or a registration time point.

The at least one processor may be further configured to execute the instructions to receive, every designated period, a packet broadcast from an external device that is not determined as the device to be connected among the one or more external devices, and monitor state information of the external device that is not determined as the device to be connected, based on the received packet.

According to an aspect of the disclosure, an operation method of an electronic device, the operation method including: based on detection of a first event associated with an external device, identifying first information relating to Bluetooth usage of the electronic device and second information relating to a wireless network resource state; determining a number of connectable devices, based on the first information and the second information; identifying state information of one or more external devices registered in the electronic device; determining a priority of the one or more external devices, based on the state information; determining at least one external device, from among the one or more external devices, as a device to be connected, based on the number of connectable devices and the priority; and connecting a channel with the at least one external device determined as the device to be connected.

The operation method may further include: transmitting control information on the at least one external device through the connected channel; and transmitting connection state information on the one or more external devices to a server according to a designated time period.

The first event may include at least one of state change, plugin detection, or a designated operation performing of the external device, the first information may include at least one of a number of devices paired with the electronic device, in-use profile information, a connection state, or an operation activation state, and the second information may include at least one of a data usage amount measured in the electronic device, or a network function activation state.

The identifying the state information of the one or more external devices registered in the electronic device may include registering the one or more external devices, based on at least one of a connection request received in the electronic device or a packet received every designated period.

The operation method may further include: scanning for a packet broadcast from the external device according to a first period while a display of the electronic device is turned on; and scanning for a packet broadcast from the external device according to a second period that is a time unit greater than the first period, while the display is turned off.

The determining the priority of the one or more external devices may include, based on the state information of the one or more external devices being identical, determining the priority, based on at least one of a subject of registration in the electronic device or a registration time point.

The operation method may further include: receiving, every designated period, a packet broadcast from an external device that is not determined as the device to be connected among the one or more external devices; and monitoring state information of the external device that is not determined as the device to be connected, based on the received packet.

According to one or more embodiments of the disclosure, an electronic device may determine the number of external devices to be connected among neighboring external devices in consideration of wireless network connection congestion and system resources, thereby preventing degradation of performance of a service provided in the electronic device. In addition, an electronic device may determine an external device to be connected according to priority determined based on the state of each external device, thereby reducing unnecessary battery consumption and a communication load which may be incurred by an external device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments disclosed herein will be described with reference to the accompanying drawings. The description does not limit various embodiments of the disclosure to a particular embodiment, and it should be understood as including various modifications, equivalents, and/or alternatives of the disclosure. In the description of drawings, the same or similar elements may be indicated by the same or similar reference signs.

Figure 1:
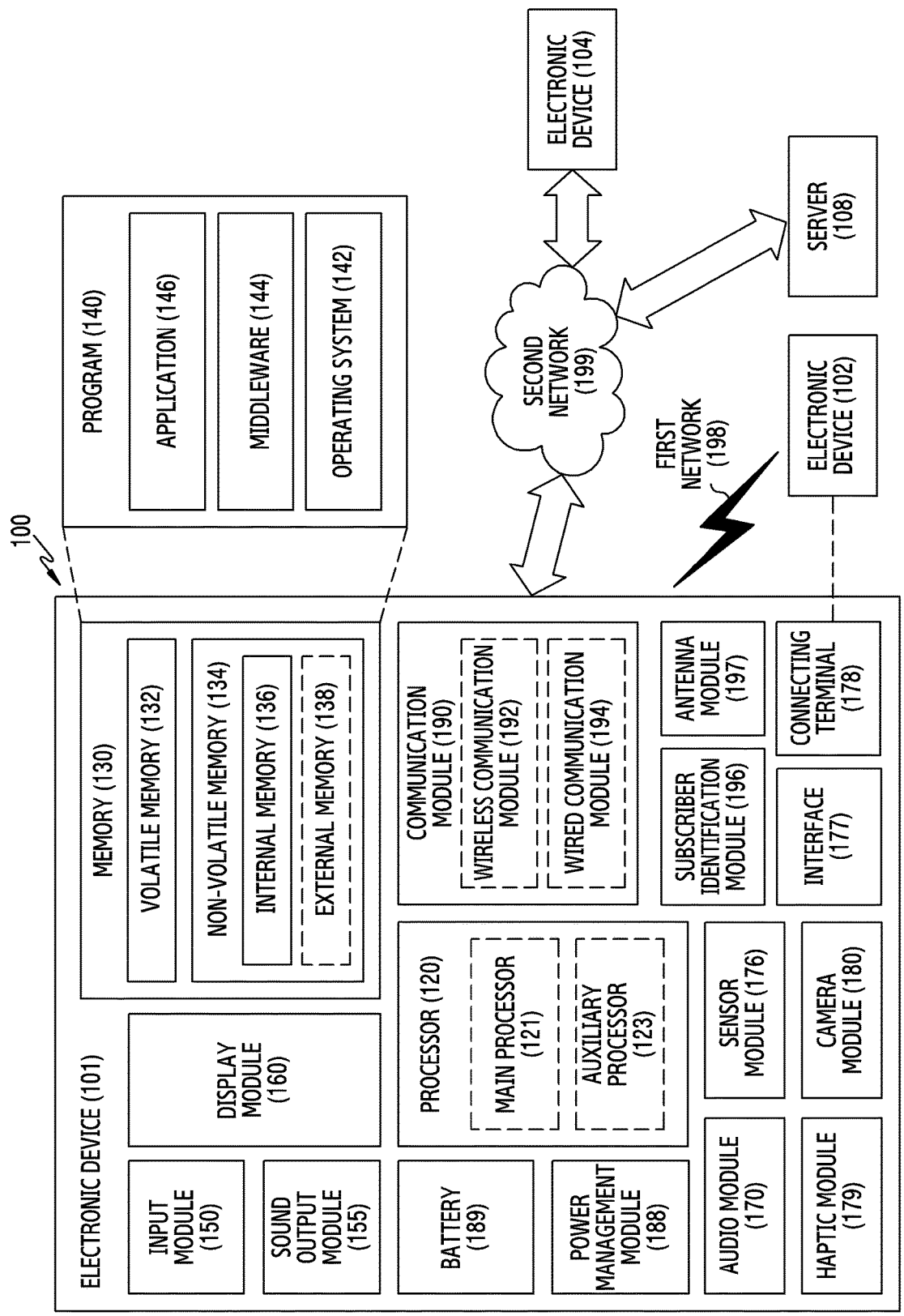
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module or communication circuit 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
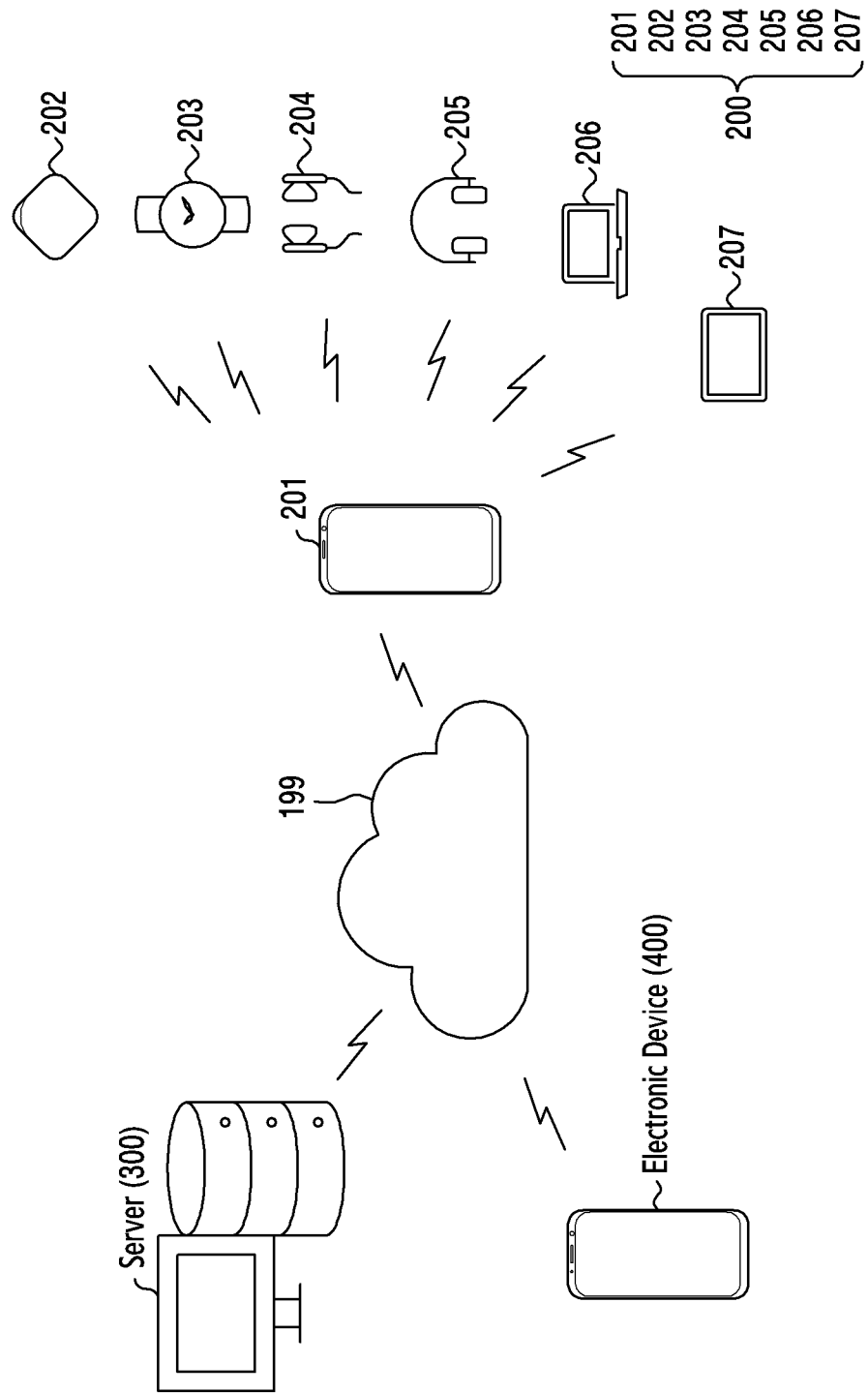
FIG. 2 illustrates a system of identifying the location of a user device according to an embodiment.

FIG. 2 illustrates a system of identifying the location of a user device according to an embodiment.

Referring to FIG. 2, a system according to an embodiment may include user devices 200, a server 300, and an electronic device 400. At least one device among the electronic device 400 and the user devices 200 may be connected to the server 300 over a second network 199 (e.g., Wi-Fi or a cellular network).

In an embodiment, the user devices 200 may include multiple devices. For example, a user may own not only a first device 201 mainly used thereby, but also at least one of a second device 202, a third device 203, a fourth device 204, a fifth device 205, a sixth device 206, or a seventh device 207. The first device 201 may be a mobile communication device such as a smartphone. The second device 202 is a small tag device that is not easily findable, and may be manufactured in a form of a small article, such as a key ring or a button, or a form mountable to a different electronic device or object. The third device 203 may be a wearable device such as a smart watch. The fourth device 204 may be wireless earphones such as earbuds. The fifth device 205 may be a Bluetooth headphone or headset. The sixth device 206 may be a notebook. The seventh device 207 may be a tablet. In addition to the example illustrated in FIG. 2, a user may use a different proper device in conjunction with the first device 201. For example, a key fob, a wallet, a backpack, a recognition device for dogs or cats, a vehicle, a bicycle, an identification card, a briefcase, an umbrella, and/or other gears may also be devices capable of interworking with the first device 201 if satisfying a communication function described in various embodiments of this document. If necessary (e.g., in a case of loss), the first device 201 may track the location of a device capable of interworking. In addition, in some embodiments, a user may use two or more same type devices. For example, a user may use multiple smartphones (e.g., the first devices 201) in conjunction with each other. In addition, a user may use two or more tablets (e.g., the seventh devices 207) in conjunction with the first device 201.

In an embodiment, the user devices 200 may be connected to each other by using one or multiple communication protocols. For example, the first device 201 may be connected to at least one of the second device 202, the third device 203, the fourth device 204, the fifth device 205, the sixth device 206, or the seventh device 207 over a short-range network. For example, a network (e.g., a short-range network) for establishing a connection between the user devices 200 may be properly selected. For example, together with or instead of Bluetooth, Bluetooth low energy (BLE), Wi-Fi direct, near field communication (NFC), ultra-wide-band (UWB) communication, or infra-red communication may be used to establish a connection between the user devices 200. In addition, in an embodiment, the user devices 200 may establish a connection by using a mesh network (e.g., Zigbee or Z-Wave) as a short-range wireless communication.

In an embodiment, the user devices 200 may have various methods to connect each other according to device information (e.g., device elements). For example, in a case where at least one of the user devices 200 is an IP-based (IP address) device, a connection with the second network 199 may be established using a service set identifier (SSID), and in a case where the at least one is not an IP-based device (e.g., BLE, Zigbee, or Z-Wave), a connection with the second network 199 may be established using a user device (e.g., the first device 201) or a hub device.

In an embodiment, at least one of the user devices 200 may broadcast an advertising packet for providing a finding function for loss. For example, when the second device 202 determines that itself has been lost, the second device may broadcast various information including identification information of itself (the second device 202) by using a packet. The packet may be broadcast to be received one or multiple electronic devices located within a predetermined communicable distance other than the second device 202. In various embodiments of this document, a packet or an advertising packet may be understood as a signal, a message, or a beacon allowing recognition of device loss.

In an embodiment, at least one of the user devices 200 may determine its loss state according to various criteria. For example, when a first time (e.g., 15 minutes) has passed from a time point at which the second device has been lastly connected to a mother terminal or the first device 201 that is a main terminal, the second device 202 may determine as entering an offline state indicating disconnection from the first device 201. For example, when a second time (e.g., 24 hours) has further passed after entering an offline state, the second device 202 may determine itself as having been lost. According to various embodiments, the second device 202 may additionally considering a remaining battery power other than a time in determining loss. In this case, the remaining battery power may be its (the second device 202) remaining battery power, and the time may be a first time (e.g., 15 minutes) and a second time (e.g., 24 hours). Various loss determination criteria may be applied to the first time and second time and/or the remaining battery power by a user configuration or a manufacturer's criterion.

In various embodiments, with reference to FIG. 1, the description for the electronic device 101 may be properly applied to the user devices 200. For example, in a case where the first device 201 of a user is a smartphone, the first device 201 and the electronic device 101 may be the same device. In addition, for example, in a case where the fourth device 204 of a user is earbuds not including a display, other description excluding a part for the display module 160 from the description for the electronic device 101 may be properly applied to the fourth device 204.

In an embodiment, the server 300 may correspond to the server 108 in FIG. 1. In a case where at least one of the remaining devices 202, 203, 204, 205, 206, and 207 except for the first device 201 among the user devices 200 is lost, the server 300 may provide a function of identifying the location of the lost at least one device. In various embodiments disclosed herein, for convenience of explanation, an example in which, in a case where the second device 202 among the user devices 200 is lost, the first device 201 identifies the location of the lost second device 202 is mainly described.

In an embodiment, the electronic device 400 may be a device of a user different from the owner of the second device 202. The electronic device 400 may be located near the second device 202 and thus directly or indirectly obtain an advertising packet broadcast from the second device 202. The electronic device 400 may include a short-range communication circuit for receiving a signal broadcast by the second device 202 by using a short-range communication scheme (e.g., BLE). In addition, the electronic device 400 may include a location measurement circuit (e.g., a GPS circuit) for measuring the location thereof. In addition, the electronic device 400 may include a long-distance communication circuit (e.g., a communication circuit supporting a cellular network and/or a Wi-Fi network) for transmitting information on the second device 202 and the location of the electronic device to the server 300.

In an embodiment, the electronic device 400 may be a device (e.g., a smartphone) that is the same type as that of the first device 201. A part or the entirety of the description for the electronic device 101 given with reference to FIG. 1 may be applied to the electronic device 400. In addition, in various embodiments of this document, contents described for a configuration or a function of the first device 201 may be also applied to the electronic device 400, but the disclosure may not be necessarily limited thereto. The electronic device 400 may be a random electronic device supporting a communication function described above.

Figure 3:
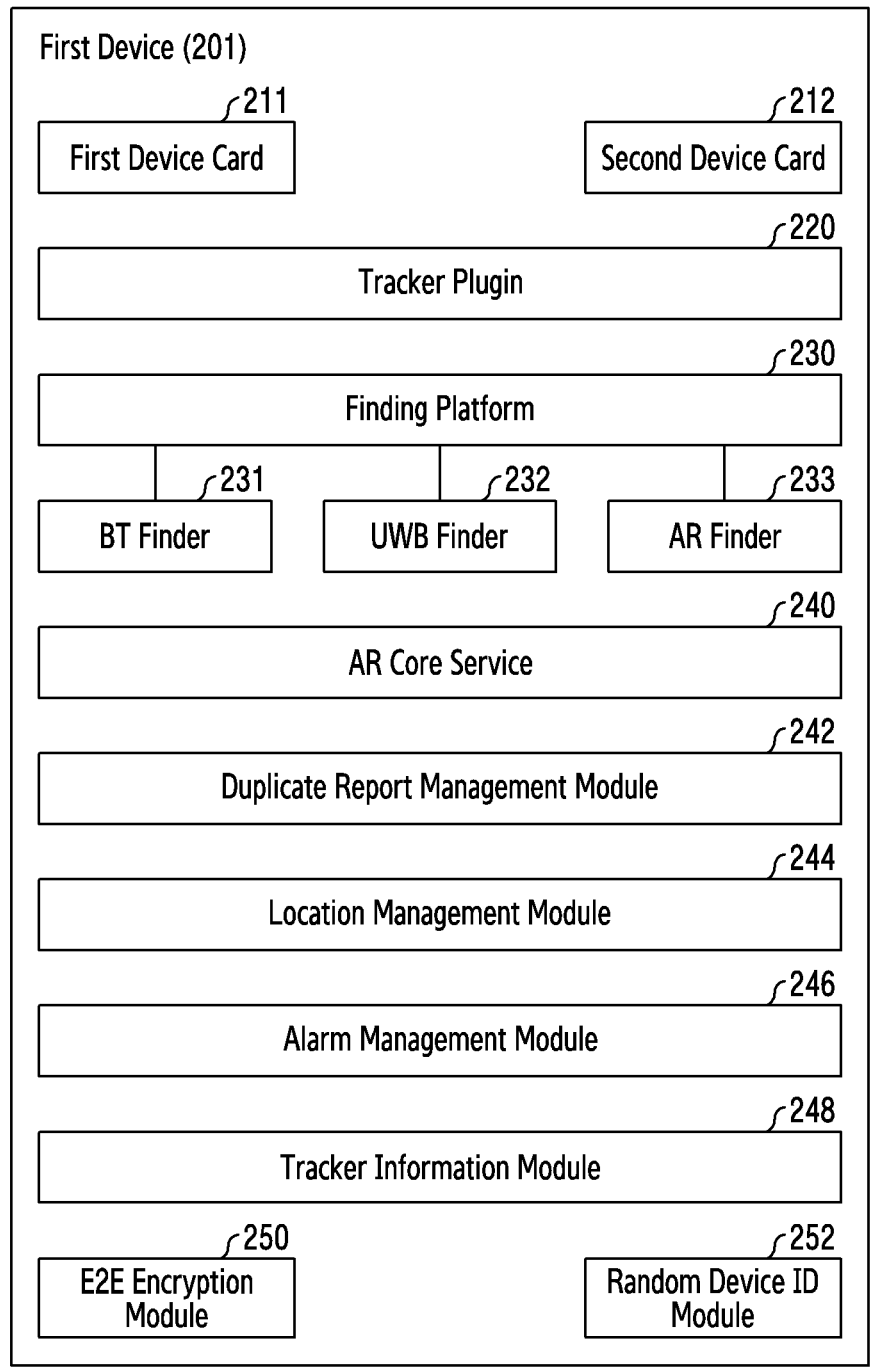
FIG. 3 illustrates modules related to various functions of an electronic device according to an embodiment.

FIG. 3 illustrates modules related to various functions of an electronic device according to an embodiment.

Various functions described with reference in FIG. 3 may be understood as functions supported by the first device 201 in view of finding the second device 202. In addition, various functions described with reference in FIG. 3 may be understood as functions supported by the electronic device 400 in view of processing an advertising packet obtained from the second device 202. As described above, the first device 201 and the electronic device 400 are different from each other only in whether the corresponding device is a device of a user finding the second device 202 or a device of a user providing help in finding the second device 202. A function described with reference to FIG. 3 may be provided both in the first device 201 and the electronic device 400. Hereinafter, a description will be given based on the first device 201.

A function or operation described with reference to FIG. 3 may be understood as a function performed by a processor of the first device 201. The processor may execute commands (e.g., instruction) stored in a memory to implement a software module illustrated in FIG. 3, and control hardware (e.g., the communication module 190 in FIG. 1) associated with a function.

In an embodiment, the first device 201 may manage at least one device card. For example, a first device card 211 for the first device 201 may be registered in the first device 201. In addition, a second device card 212 for the second device 202 having a history of interworking with the first device 201 may be registered in the first device 201. A device card (e.g., the first device card 211 or the second device card 212) may include information such as a name and/or identification information of a device, a state of the device, battery information of the device, a location history of the device and/or a current location of the device, or a message related to the device. In an embodiment, information included in the first device card 211 and/or the second device card 212 may be configured and/or changed via a user. For example, a user of the first device 201 and/or the second device 202 may configure a name, a device kind (e.g., type), or policy information related to the first device 201 and/or the second device 202.

In an embodiment, the first device 201 and the second device 202 may share the same user account. In this case, the first device card 211 and the second device card 212 may have been registered with respect to the same user account. For example, in a case where an input to identify the location of a device interworking with the first device 201 is received by a user of the first device 201, the first device 201 may provide a user interface (UI) showing information on the first device card 211 and the second device card 212 stored in the memory, via a display (e.g., the display module 160 in FIG. 1). An example UI will be described later with reference to FIG. 7.

In an embodiment, a user account of the first device 201 may be different from a user account of the second device 202. In this case, when it is identified that the first device 201 and the second device 202 having different user accounts are able to trust each other, the first device card 211 and the second device card 212 may be registered with respect to the same user account. For example, when it is identified that a first user of the first device 201 and a second user of the second device 202 are family, information on the second device 202 may be identified through a first user account of the first user of the first device 201. Hereinafter, a description is given based on the same user for convenience, but various embodiments may be applied even in a case where the users of the first device 201 and the second device 202 are different.

In an embodiment, a tracker plugin 220 may be understood as a module for registering a user device. For example, the first device 201 may drive the tracker plugin 220. The tracker plugin 220 may provide an easy user configuration (easy setup pop), or a function of registration using QR code (QR triggering) or manual registration (manual onboarding). For example, a user may capture an image of a QR code attached to a product case or one surface of the second device 202 by using a camera (e.g., the camera module 180 in FIG. 1) mounted in the first device 201, thereby registering the second device 202 in the server 300 in conjunction with a user account.

In an embodiment, a finding platform 230 may perform a function for finding a lost electronic device. The finding platform 230 may control hardware to effectively find a lost electronic device according to the distance from the electronic device. For example, the finding platform 230 may operate together with a BT finder 231, a UWB finder 232, and/or an AR finder 233. The BT finder 231 may control a Bluetooth communication circuit, the UWB finder 232 may control a UWB communication circuit, and the AR finder 233 may control a display.

In an embodiment, the BT finder 231 may operate when the distance between the first device 201 and the second device 202 is within a first distance (e.g., about 100 m). The finding platform 230 may control the BT finder 231 to, when the distance between the first device 201 and the second device 202 is within the first distance, receive a packet from the second device 202 or establish a short-range communication connection with the second device 202 by using a short-range communication circuit supporting BLE communication and/or Bluetooth communication.

In an embodiment, the UWB finder 232 may operate when the distance between the first device 201 and the second device 202 is within a second distance (e.g., about 50 m) smaller than the first distance. The finding platform 230 may control the UWB finder 232 to activate a UWB communication circuit connected to multiple UWB antennas so as to receive a signal of a UWB channel used for positioning. The finding platform 230 may receive a UWB signal received from the second device 202 by using the UWB communication circuit, and estimate the location of the second device 202, based on an arrival time and/or arrival angle of a signal received by each of the multiple UWB antennas.

In an embodiment, the AR finder 233 may implement augmented reality (AR) on a display when the second device 202 is located at a short distance, thereby visually helping the user to find the second device 202. Herein, the short distance may be substantially the same as the second distance or may be within a third distance smaller than the second distance. The finding platform 230 may output image data obtained via a camera on a display, and control the AR finder 233 to display the location of the second device 202 identified via the UWB finder 232 on a screen output on the display. In addition, in a case where the first device 201 fails to effectively receive a UWB signal from the second device 202 (e.g., a receiver sensitivity is a threshold or smaller), the AR finder 233 may guide the first device 201 via the display to have a posture (angle) suitable to receive a UWB signal.

In an embodiment, in a case where the AR finder 233 is activated for operation, an AR core service 240 may be activated together. The AR core service 240 may control the first device 201 to access an AR service providing server and/or a person/object recognition database stored in a memory so as to reinforce an augmented reality environment.

In an embodiment, the BT finder 231, the UWB finder 232, and/or the AR finder 233 included in the finding platform 230 may operate simultaneously or selectively based on the distance from the second device 202. For example, in a case where the distance between the first device 201 and the second device 202 is within the second distance (e.g., about 50 m), the BT finder 231 and the UWB finder 232 may simultaneously operate, or the UWB finder 232 may selectively operate.

In an embodiment, in a case where the first device 201 receives an advertising packet from a random lost device (e.g., the second device 202), a duplicate report management module 242 may manage of an operation of broadcasting the received advertising packet again, or reporting same to a server. The duplicate report management module 242 may provide a function for preventing duplicate reporting of information on a random lost device (e.g., the second device 202). For example, in a case where an advertising socket received from the second device 202 satisfies a predetermined condition, the duplicate report management module 242 may perform an operation of re-broadcasting/reporting to a server. In a case where an advertising socket received from the second device 202 does not satisfy a predetermined condition, the duplicate management module 242 may not perform an operation of re-broadcasting or an operation of reporting to a server. For example, the duplicate report management module 242 may operate when the first device 201 performs a role (e.g., a role of a device of a user providing a help in finding a random lost device (e.g., the second device 202)) of the electronic device 400.

In an embodiment, a location management module 244 may manage a current location and/or a location change history of the second device 202, obtained from the server 300. The location management module 244 may control a location measurement circuit, such as a GPS, included in the first device 201, to identify and/or manage the location of the first device 201.

In an embodiment, an alarm management module 246 may manage alarm-related information of the second device 202. The alarm-related information may include an alarm-related command for the second device 202, obtained from the server 300 and/or an alarm control state obtained from the second device 202. For example, in a case where an alarm-related characteristic value is obtained from the second device 202, the alarm management module 246 may identify and manage an alarm control state of the second device 202, based on the obtained alarm-related characteristic value. As another example, in a case where an alarm command for the second device 202 is obtained from the server 300, the alarm management module 246 may identify and manage an alarm control state of the second device 202, based on data included in the alarm command.

In an embodiment, a tracker information module 248 may manage a type of the second device 202 and/or identification information of the second device 202. The tracker information module 248 may operate when the first device 201 performs a role of the electronic device 400. For example, the tracker information module 248 may store and/or manage a device type (e.g., a smart watch, earphones, a headphone, or a tablet) of the second device 202, a communication type (e.g., BLE availability, Bluetooth availability, cellular network availability, or UWB communication availability), and/or identification information (e.g., a device unique ID, a network identification ID, or a user defined ID).

In an embodiment, an E2E encryption module 250 may perform encryption between end nodes. The E2E encryption module 250 may operate when the first device 201 performs a role of the electronic device 400. For example, in a case where the electronic device 400 transmits a message including location information of the electronic device 400 and identification information of a random lost device (e.g., the second device 202) to the server 300 in response to reception of an advertising packet from the lost device, the E2E encryption module 250 may apply an encryption algorithm to the message. When the E2E encryption module 250 encrypts the message by using an encryption key related to the lost device, a device having a decryption key corresponding to the encryption key of the lost key may obtain location information of the lost device. For example, the electronic device 400 may encrypt a message including location information of the electronic device 400 and identification information of the second device 202 with a public key of the second device 202, and transmit the encrypted message to the server 300. The first device 201 may obtain encrypted information on the lost second device 202 from the server 300 and then decrypt the information with a private key of the second device 202 to identify the location (=the location of the electronic device 400) of the second device 202. For example, the first device 201 may secure the private key of the second device 202 in a process of registering the second device 202 in a user account or the server 300 or a process of being paired with the second device 202.

In an embodiment, a random device ID module 252 may change an identification ID of a device into a random ID by using a predetermined algorithm. The random device ID module 252 may operate when the first device 201 performs a role of the electronic device 400. For example, in a case where an advertising packet is received from the second device 202, the electronic device 400 may change an identification ID of the second device 202 into a random ID and transmit a message to the server 300. The first device 201 may identify an ID of the second device 202 from the random ID by using a predetermined algorithm.

Figure 4:
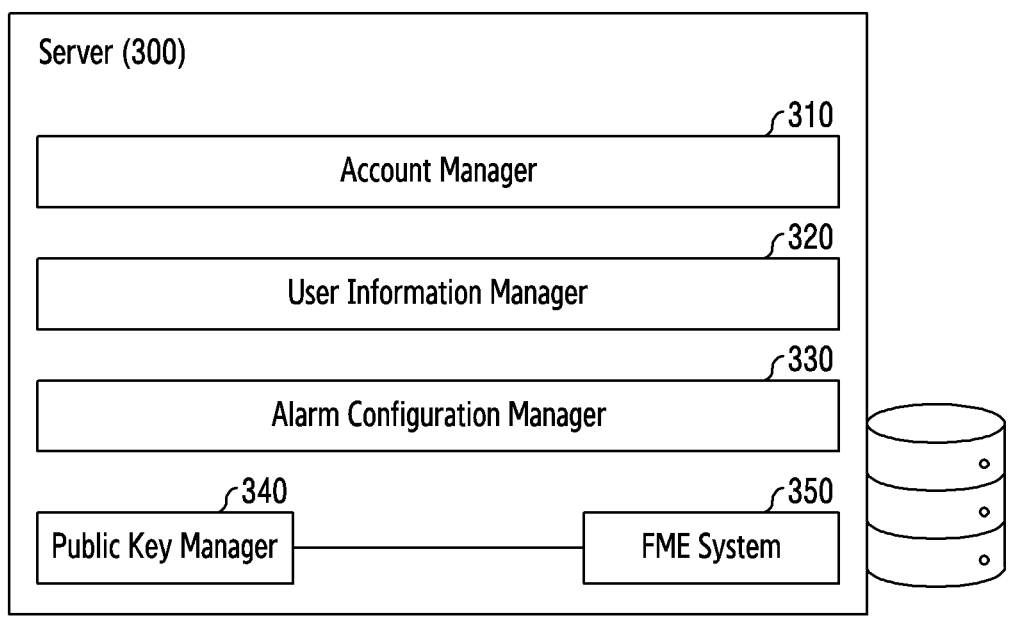
FIG. 4 illustrates modules related to various functions of a server according to an embodiment.

FIG. 4 illustrates modules related to various functions of a server according to an embodiment.

Referring to FIG. 4, the server 300 may include an account manager 310, a user information manager 320, an alarm configuration manager 330, a public key manager 340, and a find my everything (FME) system 350. The elements of the server 300 are classified from functional perspectives to implement various embodiments. The server 300 may be implemented by many hardware devices (e.g., many processors and storage devices for the server). The server 300 may be understood as multiple servers. For example, the server 300 may include a first server for providing an electronic device finding service in a first country, and a second server for providing an electronic device finding service in a second country.

In an embodiment, the server 300 may include the account manager 310. The account manager 310 may manage a user account registered in the server 300 and/or at least one device connected to the user account. For example, in a case where the first device 201, the second device 202, and the third device 203 are registered in a first user account, even when a request related to the second device 202 is received from the first device 201, the account manager 310 may allow the first device 201 to access information on the second device 202 since the first device 201 and the second device 202 are connected to the same first user account.

In an embodiment, the server 300 may include the user information manager 320. The user information manager 320 may manage registration, addition, removal, and/or modification of user information associated with a user account.

In an embodiment, the server 300 may include the alarm configuration manager 330. The alarm configuration manager 330 may determine whether generation of an alarm of a lost device (e.g., the second device 202) is needed. The server 300 may determine that the second device 202 has been lost, based on a first signal received from the electronic device 400. The first signal may include identification information and location information of the second device 202. The alarm configuration manager 330 may determine to generate an alarm only when a designated condition for the second device 202 having been lost is satisfied. For example, in a case where location information is continuously received from the same electronic device 400 after passage of a designated time from generation of an alarm from the second device 202, or location information is received from the same electronic device 400 after detection of a location change of the second device 202, the alarm configuration manager 330 may determine that generation of an alarm from the second device 202 is needed. According to various embodiments, even in a case where location information related to the second device 202 is periodically received from multiple electronic devices 400, the alarm configuration manager 330 may determine that generation of an alarm of the second device 202 is needed, generate an alarm command to be configured for the second device 202, and transfer same to at least one electronic device 400. In addition, the alarm configuration manager 330 may manage alarm-related data including a time, a count, and/or a location of alarm generation of the second device 202.

In an embodiment, the public key manager 340 may manage a public key of devices registered in the server 300. The public key may be managed in a unit of user accounts or a unit of devices. For example, one public key may be configured per one user account. As another example, in a case where five devices are connected to the same user account, different five public keys may be assigned to the five devices, respectively.

In an embodiment, the FME system 350 may perform processing for providing a lost device finding service. For example, when a public key for the lost second device 202 is requested by the electronic device 400, the FME system 350 may obtain the public key for the second device 202 from the public key manager 340, and provide the obtained public key to the electronic device 400. For example, the FME system 350 may identify a user account in which the second device 202 is registered, via the account manager 310. The FME system 350 may identify location information corresponding to the second device 202 and/or a user account via the user information manager 320, and provide same to the first device 201 or the electronic device 400.

Figure 5:
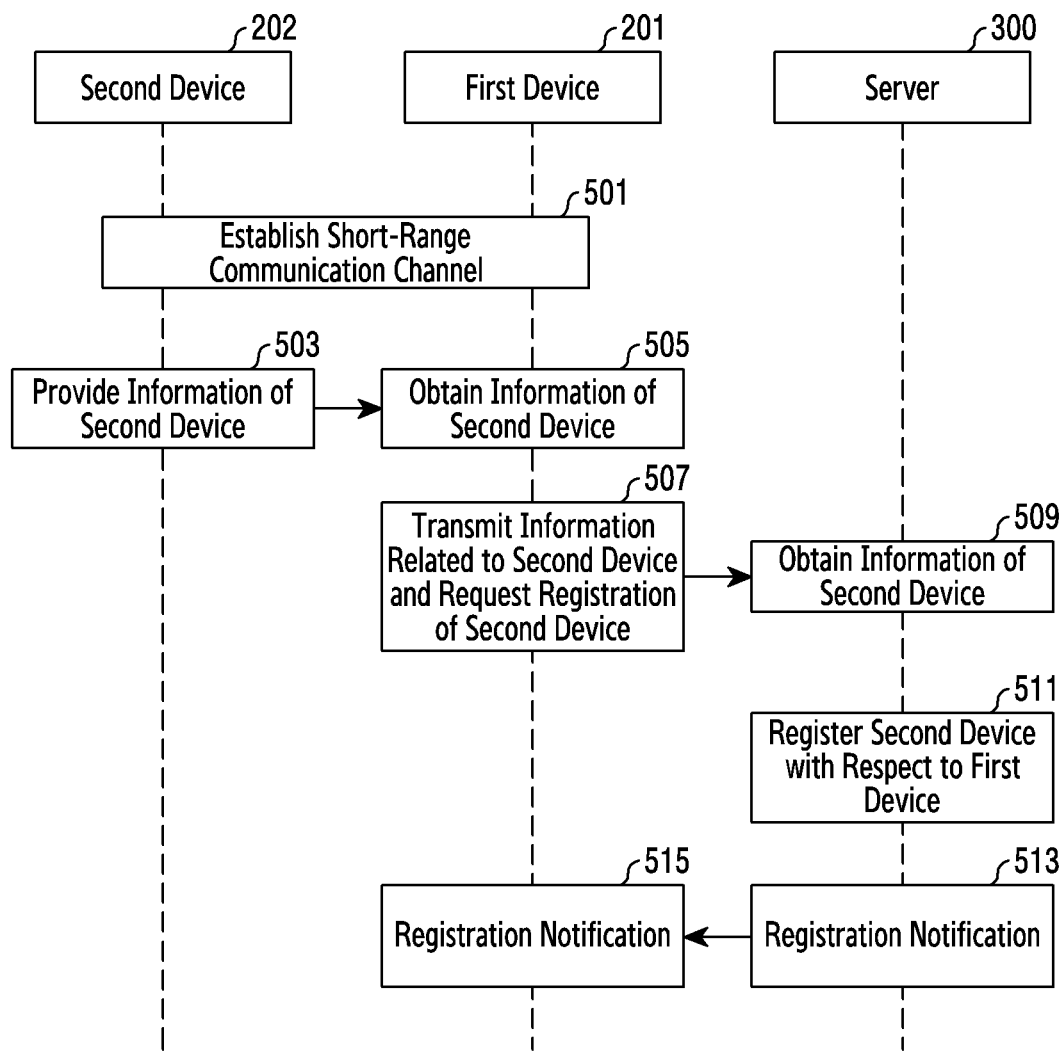
FIG. 5 illustrates a flowchart in which a first device registers a second device in a server according to an embodiment.

FIG. 5 illustrates a flowchart in which a first device registers a second device in a server according to an embodiment.

Referring to FIG. 5, in operation 501, the first device 201 may establish a short-range communication channel with the second device 202. For example, the short-range communication channel may be a device-to-device connection such as Bluetooth or Wi-Fi direct, but is not limited thereto.

According to an embodiment, in operation 503, the second device 202 may provide information of the second device 202 to the first device 201 through the short-range communication channel. The information of the second device 202 may include, for example, a type (e.g., a tag, a smart watch, or a tablet) of the second device 202, unique identification information (e.g., a device ID), a manufacturer of the second device 202, hardware information (e.g., processor performance, memory capacity, and/or battery capacity) of the second device 202, software information (e.g., a type and version of an operating system, an installed application, and/or availability of a device finding service) of the second device 202, and/or information on communication performance (e.g., Bluetooth availability, BLE availability, UWB availability, cellular availability, Wi-Fi availability, NFC availability, and/or MST availability).

According to an embodiment, in operation 505, the first device 201 may obtain information of the second device 202. The first device 201 may store the obtained information of the second device 202 in a memory (e.g., the memory 130 in FIG. 1) of the first device 201.

According to an embodiment, in operation 507, the first device 201 may transmit information on the second device 202 to the server 300 and request registration of the second device 202. For example, the first device 201 may transmit a designated form of message to the server 300. The designated form of message may include information of the first device 201, user information of the first device 201, a request of registration of the second device 202, and/or information of the second device 202. For example, in a case where the first device 201 is registered in a first user account registered in the server 300, the first device 201 may transmit the message to the server 300, thereby requesting to also register the second device 202 in the first user account. As another example, in a case where the first device 201 is registered in the first user account registered in the server 300 and the second device 202 is registered in the second user account registered in the server 300, the first device 201 may transmit the message to the server 300, thereby requesting to register in a third user account (e.g., a group account) including the first user account and the second user account, or requesting to remove information of the second device 202 registered in the second user account and register the second device 202 in the first user account.

According to an embodiment, in operation 509, the server 300 may obtain information of the second device 202 from the first device 201. The server 300 may be connected to the first device 201 via a predetermined network (e.g., a cellular network or a Wi-Fi network). The server 300 may obtain information of the second device 202 transmitted from the first device 201 via the predetermined network.

According to an embodiment, in operation 511, the server 300 may register the second device 202 with respect to the first device 201. For example, the account manager 310 of the server 300 may also register the second device 202 with respect to the first user account corresponding to the first device 201 by using information obtained from the first device 201.

According to an embodiment, in operation 513, the server 300 may transmit a notification indicating that the second device 202 is registered, to the first device 201. In operation 515, the first device 201 may receive a registration notification from the server 300.

In an embodiment, operation 501 to operation 515 may be referred to as a registration procedure or an onboarding procedure of the second device 202. In addition, in an embodiment, the registration procedure or onboarding procedure may include a procedure of storing identification information (ID) of the second device 202 (e.g., tracker) in the server 300.

When a designated time has passed after disconnection from the first device 201, the second device 202 may recognize itself as having been lost, and broadcast an advertising packet including its identification information, which will be described later.

Figure 6:
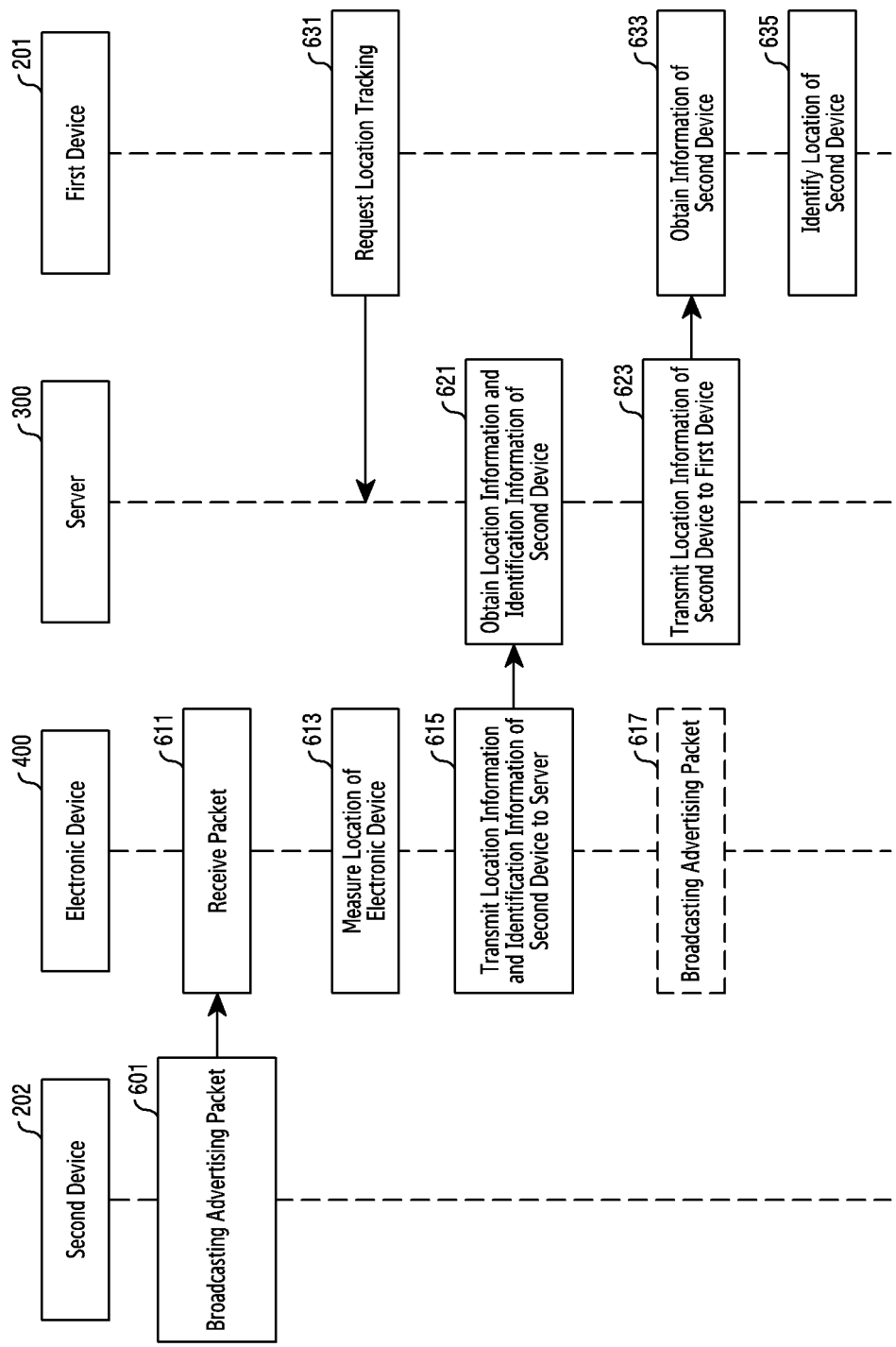
FIG. 6 illustrates a flowchart of tracking a current location of a lost device in a finding system according to an embodiment.

FIG. 6 illustrates a flowchart of tracking a current location of a second device in a finding system according to an embodiment. For reference, FIG. 6 shows a situation where the first device 201 and the second device 202 are user devices sharing the same user account, and the second device 202 has been lost in a system of FIG. 2. The electronic device 400 may be understood as a random device which is not related to a user of the first device 201, and is located at a distance allowing reception of a packet broadcast from the second device 202.

According to an embodiment, in operation 601, the second device 202 may broadcast an advertising packet by using a designated communication protocol. The designated communication protocol may correspond to one type of a low-power short-range communication protocol for minimizing battery consumption. For example, the designated communication protocol may be BLE.

In an embodiment, the second device 202 may broadcast an advertising packet when detecting its loss. As described above, a condition for the second device 202 to determine it loss may be variously configured. However, in a different embodiment, the second device 202 may broadcast an advertising packet regardless of detecting its loss. For example, the second device 202 may repeatedly broadcast an advertising packet for a predetermined time (e.g., 15 minutes) every predetermined period (e.g., one hour). As another example, the second device 202 may repeatedly broadcast an advertising packet for a predetermined time every designated time (e.g., user-configured time).

According to an embodiment, in operation 611, the electronic device 400 may receive an advertising packet broadcast by an external device. For convenience of explanation, hereinafter, reception of an advertising packet broadcast by the second device 202 is assumed.

In an embodiment, the electronic device 400 may include various communication circuits. For example, the electronic device may include a first wireless communication circuit supporting short-range communication for receiving an advertising packet. In addition, the electronic device may include a second wireless communication circuit supporting long-range communication (e.g., cellular communication) for communicating with the server 300. In addition, the electronic device 400 may include a location measurement circuit (e.g., GPS) for measuring its location. The location measurement circuit may include a positioning system using a base station or an access point (AP) of Wi-Fi or a positioning system using an NFC beacon, other than a positioning system using satellite navigation, such as GPS.

In an embodiment, an advertising packet broadcast by the second device 202 uses a designated short-range communication protocol. Therefore, receiving an advertising packet may imply that the second device 202 and the electronic device 400 exist within a communication distance allowed in the short-range communication protocol. For example, in a case where the electronic device 400 receives an advertising packet via BLE, the electronic device 400 may be presumed to be located within about 100 m from the second device 202. Therefore, in a macro view, the location of the electronic device 400 may be considered to be the same as that of the second device 202.

According to an embodiment, in operation 613, the electronic device 400 may measure the location of the electronic device 400 by using the location measurement circuit. The electronic device 400 may identify the location (e.g., latitude and/or longitude coordinates) of the electronic device 400, based on a result of the measurement.

For example, the electronic device 400 may receive GPS signals from the outside (e.g., three or more satellites) by controlling the location measurement circuit. The electronic device 400 may identify distance information from the electronic device 400 to the satellites having transmitted the GPS signals received from the outside, based on time information included in each GPS signal. The electronic device 400 may identify real-time location information of the electronic device 400 from the distance information corresponding to each satellite having transmitted the GPS signal, based on, for example, a triangulation technique.

According to an embodiment, in operation 615, the electronic device 400 may transmit measured location information and identification information of the second device 202 to the server 300. For example, the electronic device 400 may use the second wireless communication circuit described above to transmit a message including location information and identification information (e.g., a unique ID and/or a serial number) of the second device 202 to the server 300. The electronic device 400 may specify that the location information included in the message is location information of the electronic device 400, but may simply include just location information without specifying a subject of the location information.

According to an embodiment, in operation 617, the electronic device 400 may broadcast an advertising packet after transmitting a message to the server 300. For example, when an advertising packet obtained by the electronic device 400 from the second device 202 is a first packet and an advertising packet broadcast again by the electronic device 400 is a second packet, the second packet may include contents (data) substantially identical to or smaller than that of the first packet. For example, at least some fields among multiple fields included in a format of the first packet may be omitted in a format of the second packet.

In various embodiments, the electronic device 400 may broadcast an advertising before or substantially simultaneously with transmission of a message to the server 300. In addition, operation 617 may not be simply performed.

According to an embodiment, in operation 621, the server 300 may obtain a message including location information and identification information of the second device 202 from the electronic device 400. In a case where there is a request to track the location of the second device 202 from the first device 201 before and/or after acquisition of the message (e.g., operation 631), the server 300 may transmit location information of an external device (e.g., the second device 202) to the first device 201 in operation 623. For example, in operation 631, the first device 201 may transmit a request for location tracking (or location identification) for the second device 202 to the server 300, and the server 300 may transmit, to the first device 201, information on the identified location of the second device 202 in response to the request received from the first device 201. For example, the server 300 may transmit, to the first device 201, information on the most recently identified location of the second device 202.

According to an embodiment, in operation 633, the first device 201 may obtain location information of the second device 202 from the server 300. In operation 635, the first device 201 may identify the location of the second device 202, based on information obtained from the server 300. Operation 631, operation 633, and/or operation 635 may be implemented via an application providing a location identification service mounted in the first device 201. This will be described with reference to FIG. 7.

According to an embodiment, in operation 621, in a case where location information and identification information of the second device 202 are obtained from the electronic device 400, the server 300 may determine whether a location tracking request (e.g., operation 631) has been received from the first device 201 having registered the second device 202 in the server 300 with a first user account, or a different device having the first user account. For example, in a case where a location tracking request (e.g., operation 631) has not been received from the first device 201, the server 300 may not perform operation 623. According to an embodiment, the server 300 may transmit a response message to the electronic device 400, based on whether a location tracking request (e.g., operation 631) has been received from the first device 201. For example, in a case where a location tracking request (e.g., operation 631) is received from the first device 201, the server 300 may transmit, to the electronic device 400, a response message notifying that location information and identification information of the second device 202 have been transmitted to the first device 201. As another example, in a case where a location tracking request (e.g., operation 631) has not been received from the first device 201, the server 300 may request the electronic device 400 not to transmit location information and identification information of the second device 202 for a designated time. According to an embodiment, the electronic device 400 may perform an operation (e.g., operation 617) of broadcasting an advertising packet, based on a response from the server 300.

Figure 7:
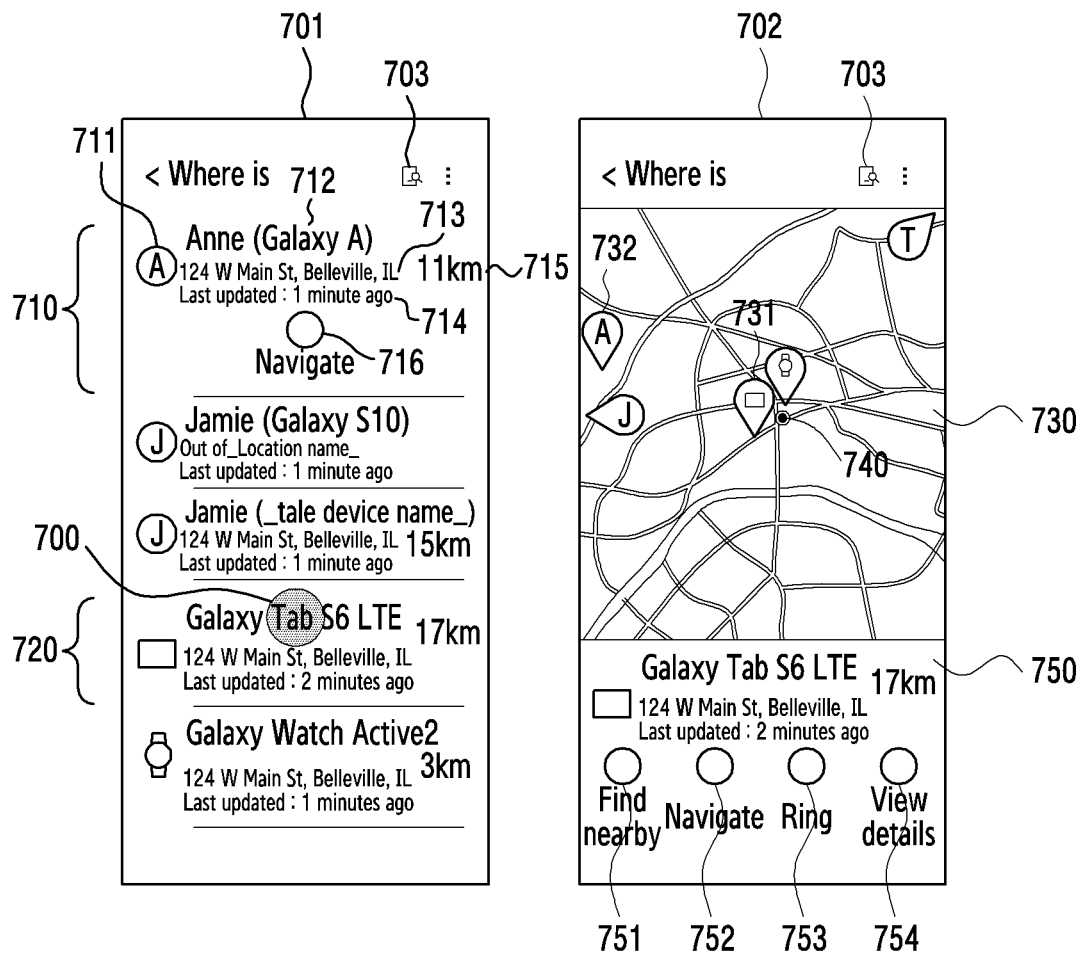
FIG. 7 illustrates a user interface for identifying the location of user devices in a first device according to an embodiment.

FIG. 7 illustrates a user interface for identifying the location of user devices in a first device according to an embodiment.

Referring to FIG. 7, a first screen 701 may be an execution screen of an application providing a location identification service of the first device 201. The first device 201 may display information on user devices registered in the first device 201 in a list type. According to an embodiment, the first screen 701 may present a list including an item corresponding to the first device card 211 and an item corresponding to the second device card 212. For example, the list of the first screen 701 may include a first item 710 corresponding to a smartphone (e.g., Galaxy A) indicating the first device 201 registered in a user account of the first device 201, and a second item 720 corresponding to a random tablet (e.g., Galaxy Tab S6 LTE) registered in the user account. In the following description, a description for the first item 710 and/or the second item 720 may also be applied to other items (e.g., "Jamie (Galaxy S10)", "Jamie (_tale device name_)", and/or "Galaxy Watch Active2") not specified in the first screen 701.

In an embodiment, each item included in the list may include various information. For example, the first item 710 may include at least one of an icon 711 indicating the smartphone, a nickname (e.g., Anne) and model name (Galaxy A) 712 of the smartphone, a lastly identified location 713 (e.g., 124 W Main St, Belleville, IL), a time 714 (e.g., Last updated: 1 minute ago) at which the location has been lastly identified, a distance 715 from the current location of the first device 201 to the smartphone, and a navigation menu 716 for executing a map application or a map function, based on the current location and the lastly identified location 713 of the first device 201. Some items in the contents described above may be omitted. For example, in a case where the location of a device is not identified, at least some of the lastly identified location 713, the time 714 at which the location has been lastly identified, or the navigation menu 716 may not be displayed.

In an embodiment, the first device 201 may automatically perform operation 631 when the application is executed. In another embodiment, the first device 201 may perform operation 631 by a user input after the application is executed. In yet another embodiment, the first device 201 may perform operation 631 every predetermined period (e.g., 12 hours), and update the locations of the user devices 200 registered in the first device 201.

In an embodiment, when a user input 700 of selecting the second item 720 among several items included in the list is generated, the first device 201 may provide a second screen 702 to a display of the first device 201. The second screen 702 may be, for example, a UI generated based on the second device card 212.

In an embodiment, the second screen 702 may include a map area 730 and a second device card area 750. For example, the map area 730 may be displayed on an upper part (area) of the second screen 702, and the second device card area 750 may be displayed on a lower part (area). However, this merely corresponds to an example, and the second device card area 750 may be disposed at a position different from that of the illustrated example. For example, the second device card area 750 may be provided to float over a map occupying most of the second screen 702. In addition, the position or size of the second device card area 750 may be moved/enlarged/reduced by a user input.

In an embodiment, the locations of the user devices 200 identified via the server 300 may be displayed on the map area 730. The locations of the user devices 200 may be displayed in an icon type. For example, the location of the smartphone corresponding to the first item 710 may be displayed on the map like a first icon 732. In addition, the location of the tablet corresponding to the second item 720 selected by the user input 700 may be displayed on the map like a second icon 731. In an embodiment, the location of the tablet corresponding to the second item 720 selected by the user input 700 may be positioned in the center of the map area 730. A current location 740 of the first device 201 may be displayed on the map area 730. In an embodiment, the current location 740 of the first device 201 may be positioned in the center of the map area 730.

In an embodiment, the second device card area 750 may include a device action menu 751, a navigation menu 752, a notification (ring) menu 753, and/or a view-details menu 764.

In an embodiment, when the device action menu 751 is selected, the first device 201 may identify whether the second device 202 (e.g., the tablet corresponding to the second item 720) is located around the first device 201. For example, when the device action menu 751 is selected, the first device 201 may provide and/or update the map area 730, based on location information of the user devices 200, received from the server 300 and the location of the first device 201. The first device 201 may perform search whether the second device 202 exists nearby, by using a designated communication protocol (e.g., BLE) in response to the device action menu 751 being selected. If the first device 201 is connected to the second device 202 by using a designated communication protocol, the first device may operate the AR finder 233 and provide the location of the second device 202 via an augmented reality interface, or determine whether to provide same.

In an embodiment, when the navigation menu 752 is selected, the first device 201 may display a path to the identified location of the second device 202 on the map area 730. In an embodiment, when the notification menu 753 is selected, the first device 201 may attempt to call the second device 202 or attempt to allow the second device 202 to make a designated sound. For example, in a case where the second device 202 supports a call function, the first device 201 may attempt to call the second device 202 in response to selection of the notification menu 753. As another example, in a case where the second device 202 is connected to the first device 201 via a predetermined short-range communication network, the first device 201 may transmit a designated signal to the second device 202 via the short-range communication network in response to selection of the notification menu 753. The second device 202 having received the designated signal may announce its location by generating a predefined notification signal (e.g., alarm, vibration, and/or light emission) in response to the designated signal.

In an embodiment, when the view-details menu 754 is selected, the first device 201 may provide more detailed information on the second device 202. For example, the first device 201 may display a state of the second device 202 according to various conditions. In a case where the second device 202 is connected to the first device 201 or a different device (e.g., the fifth device 205 or the sixth device 206) among the user devices 200, the first device 201 may display a first state message such as "Nearby Finding". The message may be displayed in a pop-up form, or displayed on the second device card area 750 of the second device 202. In a case where the second device 202 is not connected to the first device 201 or a different device among the user devices 200, but is not in a "offline finding" state, the first device 201 may display a second state message such as "Not in Range Finding". The "offline finding state" may indicate a state where the second device 202 is determined as having been lost, that is, a state where a threshold time has passed after the second device 202 has been lastly connected to one of the user devices 200.

In an embodiment, in a case where the second device 202 is neither connected to the first device 201 or a different device among the user devices 200, nor is in a "offline finding" state, but there has been an attempt to find the second device 202, the first device may display a third state message such as "Lost mode Finding". In a case where the second device 202 is not connected to the first device 201 or a different device among the user devices 200, and is in a "offline finding" state, the first device 201 may display a fourth state message such as "Update mode Finding". In a case where the first device 201 attempts to connect to the second device 202, a fifth state message such as "connecting" may be displayed. In an embodiment, the first to fifth state messages related to the device action menu 751 may be included in the first device card 211 and the second device card 212 in FIG. 3.

The first to fifth state messages described above are an example, and less or more state messages may be properly configured by a manufacturer or a user according to various embodiments. According to various embodiments, the first device 201 may provide remaining battery power information of the second device 202. The first device 201 may display the location (location information) of the second device 202, based on a time stamp. The first device 201 may display a current state of the second device 202 by using a proper message (device card message). For example, the first device 201 may display, on a display, a message indicating whether the second device 202 is located near the first device 201, whether the second device is located near a different device (e.g., the fourth device 204) among the user devices 200, what is the last location of the second device 202, whether the second device 202 is being found, or whether the second device 202 has been found.

In an embodiment, information presented in the second device card area 750 is not limited to the illustrated example, and may be provided together with at least one piece of information among information related to the device action menu 751 and information (e.g., remaining battery power information, location information, and/or device card message) included in the view-details menu 754.

Figure 8:
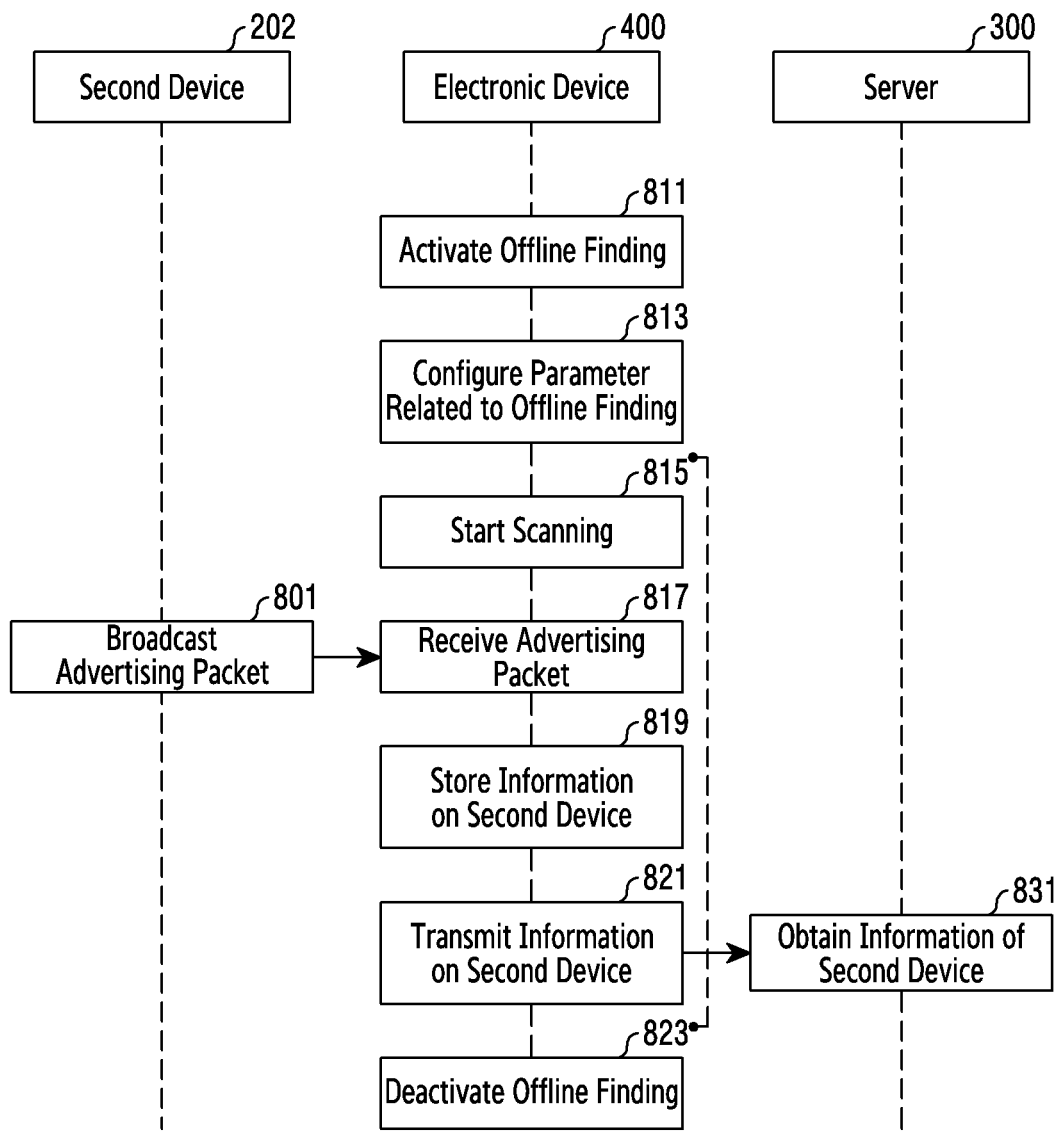
FIG. 8 illustrates a flowchart in which an electronic device performs scan to find a random external device according to an embodiment.

FIG. 8 illustrates a flowchart in which an electronic device performs scan to find a random external device according to an embodiment.

According to an embodiment, in operation 811, the electronic device 400 may activate offline finding. For example, a user of the electronic device 400 may activate an offline finding function in a configuration menu. As another example, the offline finding function may be periodically activated or may be always active. As yet another example, the offline finding function may be activated only in a designated time interval (e.g., 9 a.m. to 6 p.m.).

According to an embodiment, in operation 813, the electronic device 400 may configure parameters related to offline finding in response to activation of the offline finding function. For example, parameters, such as a scan period and a scan window, a scan interval, a scan duration time, and/or a wakeup intent, may be configured. The scan period may indicate a time for which scan occurs one time. The scan window may indicate a time for which scan is actually performed in the scan period. For example, in a case where a scan period is 2000 ms and a scan window is 200 ms, a short-range communication circuit may perform primary scan for 200 ms after wakeup, maintain a sleep state for the remaining 1800 ms, and then, after 2000 ms from the wakeup, perform secondary scan for 200 ms again.

The scan duration time may indicate a time for which scan is maintained according to the scan period. For example, the electronic device 400 may maintain scan performed every 2000 ms for one hour. The scan interval may indicate an interval between the scan duration times. For example, in a case where a scan duration time is one hour and a scan interval is four hours, the electronic device 400 may maintain scan for one hour from 00 am, maintain a sleep state for three hours, and maintain scan for one hour again from 04 am after four hours from 00 am.

According to an embodiment, operation 813 may be omitted. In a case where operation 813 is omitted, a designated configuration value (e.g., default value) may be used for a parameter configuration related to offline finding.

According to an embodiment, in operation 815, the electronic device 400 may start scanning. The scan of the electronic device 400 may be performed according to a rule defined by the parameters related to scan, configured in operation 813. The electronic device 400 may activate a first communication circuit supporting short-range communication to obtain an advertising packet obtained from an external device (e.g., the second device 202) while scan is performed.

According to an embodiment, in operation 801, the second device 202 may broadcast an advertising packet by using a designated short-range communication protocol. For example, the second device 202 may broadcast an advertising packet including identification information of the second device 202 according at a predetermined time interval by using a BLE protocol.

In an embodiment, the second device 202 may broadcast an advertising packet according to a change of a network state. For example, the second device 202 may determine whether a current network is available. For example, in a case where a network connection between the second device 202 and the server 300 or the first device 201 is lost, the second device 202 may determine whether the loss of the network connection is caused by an airplane mode. In order to identify a current network state, an application of the second device 202 (e.g., an application providing a location finding service) may reside in a memory of the second device 202. In an embodiment, in a case where the loss is not caused by the airplane mode, the second device 202 may configure an alarm, and when the time of the configured alarm has come, the second device may broadcast an advertising packet. Thereafter, when the network is restored back (e.g., a connection with the first device 201 is restored), the second device 202 may cancel the configured alarm, and stop an operation of broadcasting an advertising packet.

According to an embodiment, after scan is started, in operation 817, the electronic device 400 may receive an advertising packet from an external device, for example, the second device 202. In operation 817, the electronic device 400 may obtain information on the second device 202 from information included in the received advertising packet, and in operation 819, may store the obtained information in a memory of the electronic device 400.

According to an embodiment, in operation 821, the electronic device 400 may transmit information on the second device 202 to the server 300, based on information received from the second device 202. The electronic device 400 may include location information and information on the second device 202. The location information may be the location of the electronic device 400 measured by the location measurement circuit of the electronic device 400. In operation 821, the electronic device 400 may obtain, from the server 300, an encryption key for encrypting information transmitted to the server 300 so as to increase security, encrypt information on the second device 202 with the obtained encryption key, and transmit the encrypted information to the server 300. For example, the electronic device 400 may transmit at least a part of information on the second device 202 to the server 300, obtain an encryption key from the server 300, then encrypt location information and/or the information on the second device 202 with the obtained encryption key, and transmit the encrypted location information and/or information to the server 300.

According to an embodiment, the server 300 may, in operation 831, obtain location information and/or information of the second device 202 from the electronic device 400, and provide the same information as information on the location of the second device 202 to the first device 201 in response to a request of the first device 201 (e.g., operation 623 in FIG. 6).

In an embodiment, the electronic device 400 may repeat operation 815, 817, 819, and/or 821 for a predetermined time, for example, a scan duration time, and when the scan duration time is ended, may deactivate the offline finding function in operation 823. However, in a different embodiment, the offline finding function may be deactivated by various events such as a user input or a remaining battery power state of the electronic device 400.

Figure 9:
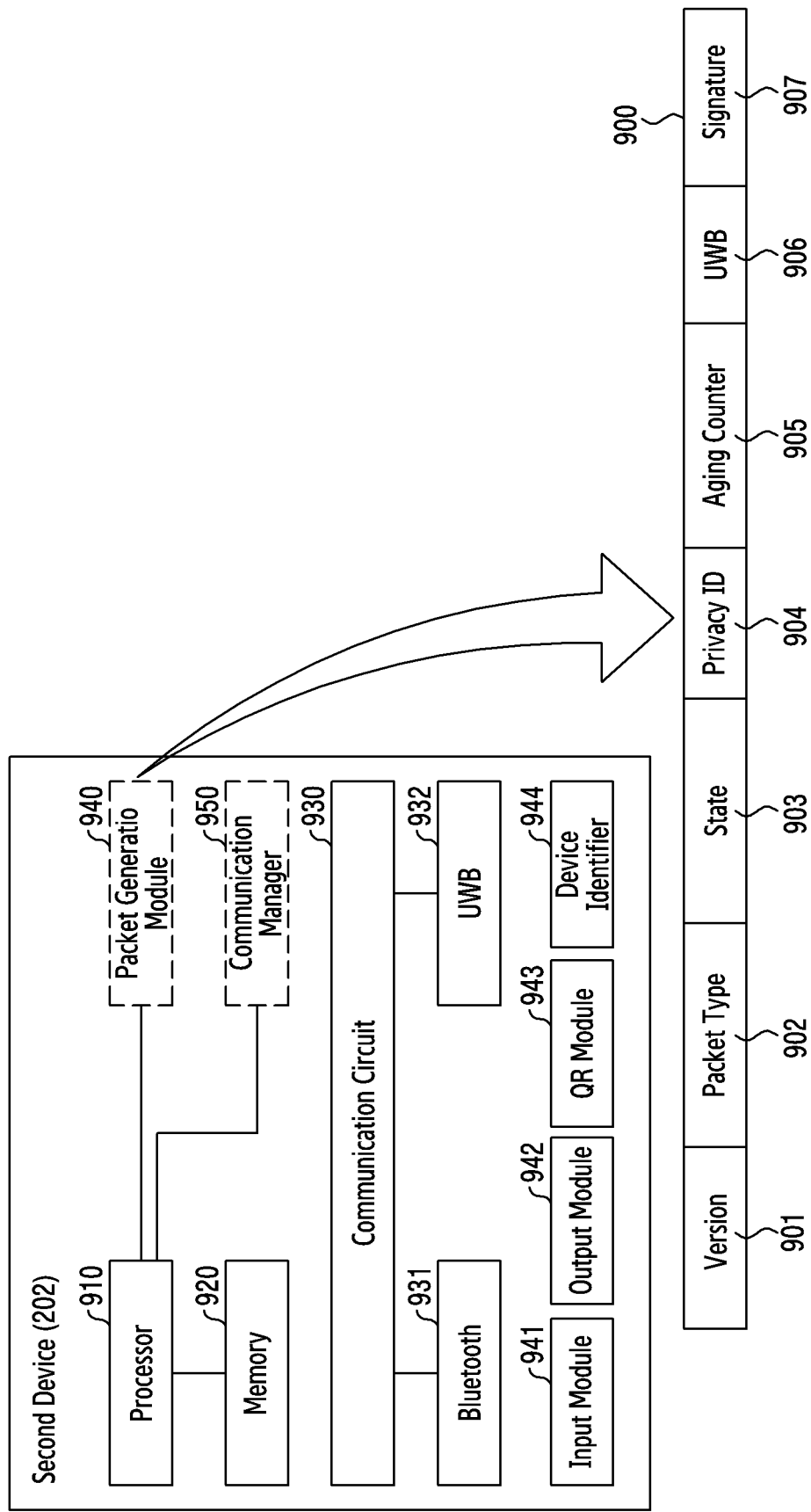
FIG. 9 illustrates a configuration of a second device and a data structure of a packet broadcast by the second device according to an embodiment.

FIG. 9 illustrates a configuration of a second device and a data structure of a packet broadcast by the second device according to an embodiment.

Referring to FIG. 9, the second device 202 may include at least one processor 910, a memory 920, and a communication circuit 930. The elements of the second device 202 illustrated in FIG. 9 is an example, and the elements described with reference to FIG. 1 may be properly applied to the second device 202. In addition, a description for FIG. 1 may be applied to elements corresponding to FIG. 1 among the elements of FIG. 9.

In an embodiment, the at least one processor 910 may execute an instruction from the memory 920, and implement a packet generation module 940 and/or a connection manager 950. The packet generation module 940 and the connection manager 950 may be understood as a software module implemented by executing a program code stored in the memory 920. In addition, in the following description, an operation described as being performed by the packet generation module 940 or the connection manager 950 may be understood as being performed by the processor 910.

Referring to FIG. 9, the at least one processor 910 may drive the packet generation module 940 by executing instructions stored in the memory 920. The packet generation module 940 may generate an advertising packet 900 including information on the second device 202. The at least one processor 910 may provide the generated advertising packet 900 to the communication circuit 930 via (by using) the connection manager 950, and the communication circuit 930 may broadcast the advertising packet 900 by using a designated protocol. According to various embodiments, the communication circuit 930 may support a short-range communication protocol of Bluetooth 931 and UWB 932.

In an embodiment, when a wireless channel connection with the first device 201 or the electronic device 400 is configured via the communication circuit 930, the at least one processor 910 may control the packet generation module 940 to change information relating to its connection state. For example, the at least one processor 910 may configure and change state information to indicate whether there is a channel usable by the second device 202, or which channel is usable. According to various embodiments, the at least one processor 910 may generate the advertising packet 900 including the state information via the packet generation module 940, and provide the generated advertising packet 900 to the communication circuit 930.

In an embodiment, the advertising packet 900 may include fields of a version 901, a packet type 902, a connection state 903, a privacy ID 904, an aging counter 905, a UWB 906, and/or a signature 907.

In an embodiment, the version 901 may indicate a version of an advertising packet. The advertising packet is required to be based on a rule shared between the second device 202 broadcasting same and the electronic device 400 receiving and analyzing same. Therefore, a version of the advertising packet may be used to determine a rule for the electronic device 400 having received the same to analyze data included in the advertising packet. For example, in a case where an advertising packet having an old version rather than a latest version is received, the electronic device 400 may analyze the advertising packet according to a rule corresponding to the old version. As another example, in a case where a version of the electronic device 400 is lower than a version of an advertising version, the electronic device 400 may update the version via a server (e.g., the server 108 in FIG. 1).

In an embodiment, the packet type 902 may indicate whether an advertising packet is to transfer information or request information. For example, in a case where the second device 202 broadcasts an advertising packet for the purpose of transferring its information, the packet type 902 may indicate a normal advertisement. In a case where the second device 202 broadcasts an advertising packet for the purpose of obtaining information from the first device 201 or the server 300, the packet type 902 may be configured to indicate a request advertisement.

In an embodiment, the connection state 903 may indicate information on whether the second device 202 is currently in an offline mode (e.g., offline finding) or an online mode. In a case where the second device 202 is currently in an online mode, the connection state 903 may indicate information on a connected state between the second device 202 and the first device 201, and which channel through which the connection is being maintained. For example, the connection state 903 may be defined by distinguishing whether a channel which the second device 202 is connecting to in an online mode is a normal channel or a reserved channel, or the two channels are both in use. In a case where the second device 202 is currently in an offline mode, the connection state 903 may be defined to indicate information on a disconnected state (offline state) between the second device 202 and the first device 201, and how much time has passed after disconnection. For example, the offline mode may be classified into premature offline, offline, and overmature offline according to a time having passed after disconnection of the second device 202. Detailed contents relating to a criterion of determination of a connection state of the second device 202 will be described with reference to FIG. 10.

In an embodiment, the privacy ID 904 may be unique identification information of the second device 202. Additionally and/or alternatively, the privacy ID 904 may be a random ID generated according to a predetermined algorithm, based on unique identification information of the second device 202. In a case where the privacy ID 904 of the second device 202 is not changed, a privacy problem may occur in that unwanted location tracking is performed by a different neighboring device having recognized the privacy ID 904, and thus the privacy ID 904 may be changed every designated time (e.g., 15 minutes).

In an embodiment, the aging counter 905 may indicate the number of changes of the privacy ID 904 after the second device 202 is onboarded. For example, in a case where the second device 202 changes the privacy ID 904 according to a period of 15 minutes, the aging counter 905 may be increased every period of 15 minutes with respect to a server time (epoch time) stored at a time point of onboarding. Change of the privacy ID 904 and increase of the aging counter 905 may be simultaneously performed.

In an embodiment, the UWB 906 may indicate whether the second device 202 is a device supporting UWB communication. The advertising packet 900 may further include information notifying whether the second device 202 supports E2E or MCF, other than UWB.

In an embodiment, the signature 907 is a digital signature value generated using a unique key of the second device 202, and may indicate whether the corresponding advertising packet is valid. The signature 907 may be calculated in real time every time an advertising packet is transmitted, and then be added to a field of the advertising packet.

In various embodiments, the second device 202 may further include an input module 941, an output module 942, a QR code 943, and a device identifier 944. In an embodiment, the input module 941 is a means for identifying a user's intent, and may be a type of a physical button. For example, in a case where an alarm is generated from the second device 202, a user may click a button included in the second device 202 to stop the alarm. In an embodiment, the output module 942 is a means which generates an audio signal, and may include a buzzer type of device. In an embodiment, the QR code 943 is a means for easily performing procedures, such as identification, registration, and/or onboarding of the second device 202, and may be printed on the second device 202 or may be printed on a separate sticker and then be attached to the second device 202. In an embodiment, the device identifier 944 is identification information uniquely assigned to the second device 202, and may include a product serial number or a short-range communication MAC address of the second device 202.

Figure 10:
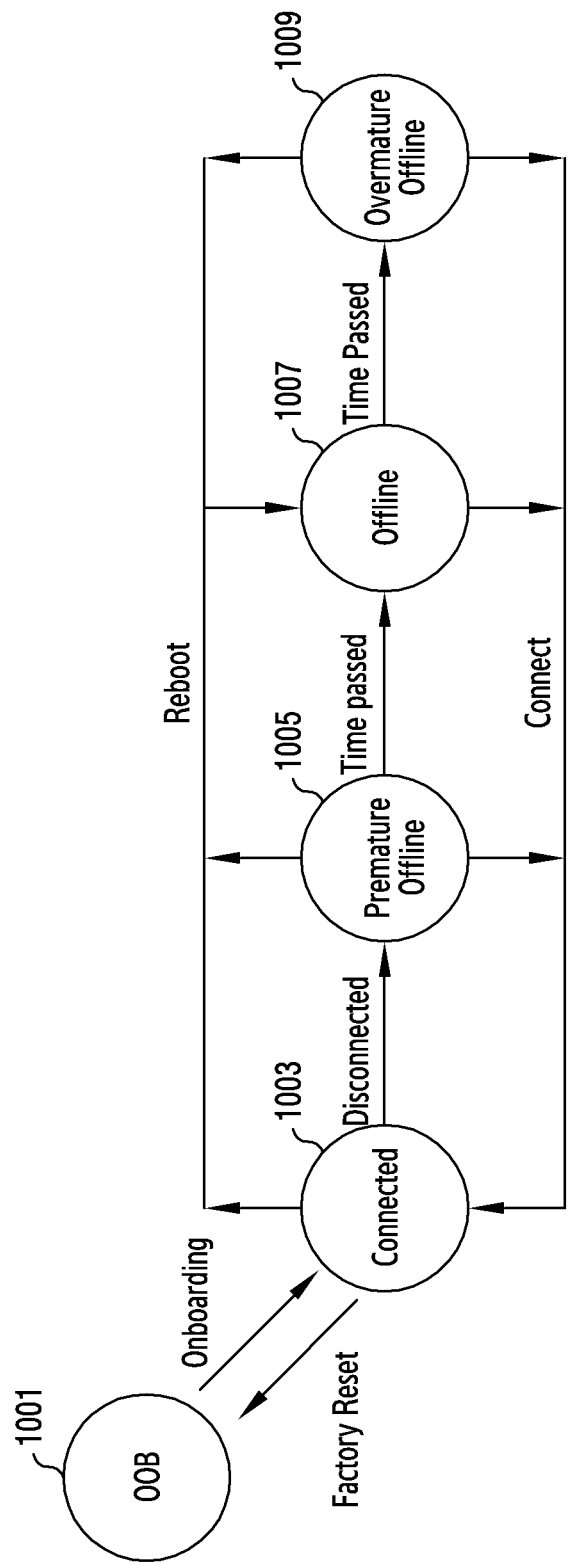
FIG. 10 illustrates a criterion for determining a state of a second device according to an embodiment.

FIG. 10 illustrates a criterion for determining a state of a second device according to an embodiment.

Referring to FIG. 10, a state of the second device 202 may be changed to out of box (OOB) 1001, connected 1003, premature offline 1005, offline 1007, or overmature offline 1009 according to a system configuration, a connection/disconnection with the first device 201, and/or a time having passed after disconnection.

In an embodiment, OOB 1001 may indicate a state before completion of system setup after initial opening of a product box of the second device 202. The second device 202 being in the state of OOB 1001 may be connected to the first device 201 through an onboarding procedure, and be registered in the server 300. The second device 202 may be converted to the state of OOB 1001 back through a factory reset even when system setup has been completed.

In an embodiment, connected 1003 may indicate a state where the second device 202 configures a short-range communication channel with the first device 201 and is connected thereto. The second device 202 may identify the first device 201 by using a shared key registered in the server 300 in an onboarding process and configure a connection. For example, the second device 202 being in the state of connected 1003 may perform communication with the first device 201, based on a generic attribute profile (GATT) connection. In addition, when a connection with the first device 210 is configured in the state of premature offline 1005, offline 1007, and overmature offline 1009, the second device 202 may be immediately converted to the state of connected 1003.

In an embodiment, premature offline 1005 may be a state before passage of a first time (e.g., 15 minutes) after the second device 202 is disconnected from the first device 201. After disconnection from the first device 210, the second device 202 is not immediately converted to the state of offline 1007, and may maintain the state of premature offline 1005 for the first time.

In an embodiment, offline 1007 may be a state after passage of the first time after the second device 202 is disconnected from the first device 201. When the first time (e.g., 15 minutes) has passed after entering into the state of premature offline 1005, the second device 202 may be converted into the state of offline 1007, and then until a second time (e.g., 24 hours) has passed, may maintain the state of offline 1007. When system reboot is started in the state of connected 1003, premature offline 1005, and overmature offline 1009, the second device 202 may be converted to the state of offline 1007. Various determination criteria may be applied to the first time and second time by a user configuration or a manufacturer's criterion.

In an embodiment, overmature offline 1009 may indicate a state after passage of the second time (e.g., 24 hours) after the second device 202 enters into the state of offline 1007. The second device 202 being in the state of overmature offline 1009 may determine that itself has been lost, and broadcast an advertising packet including identification information of the second device 202 to electronic devices located within a predetermined distance.

Figure 11:
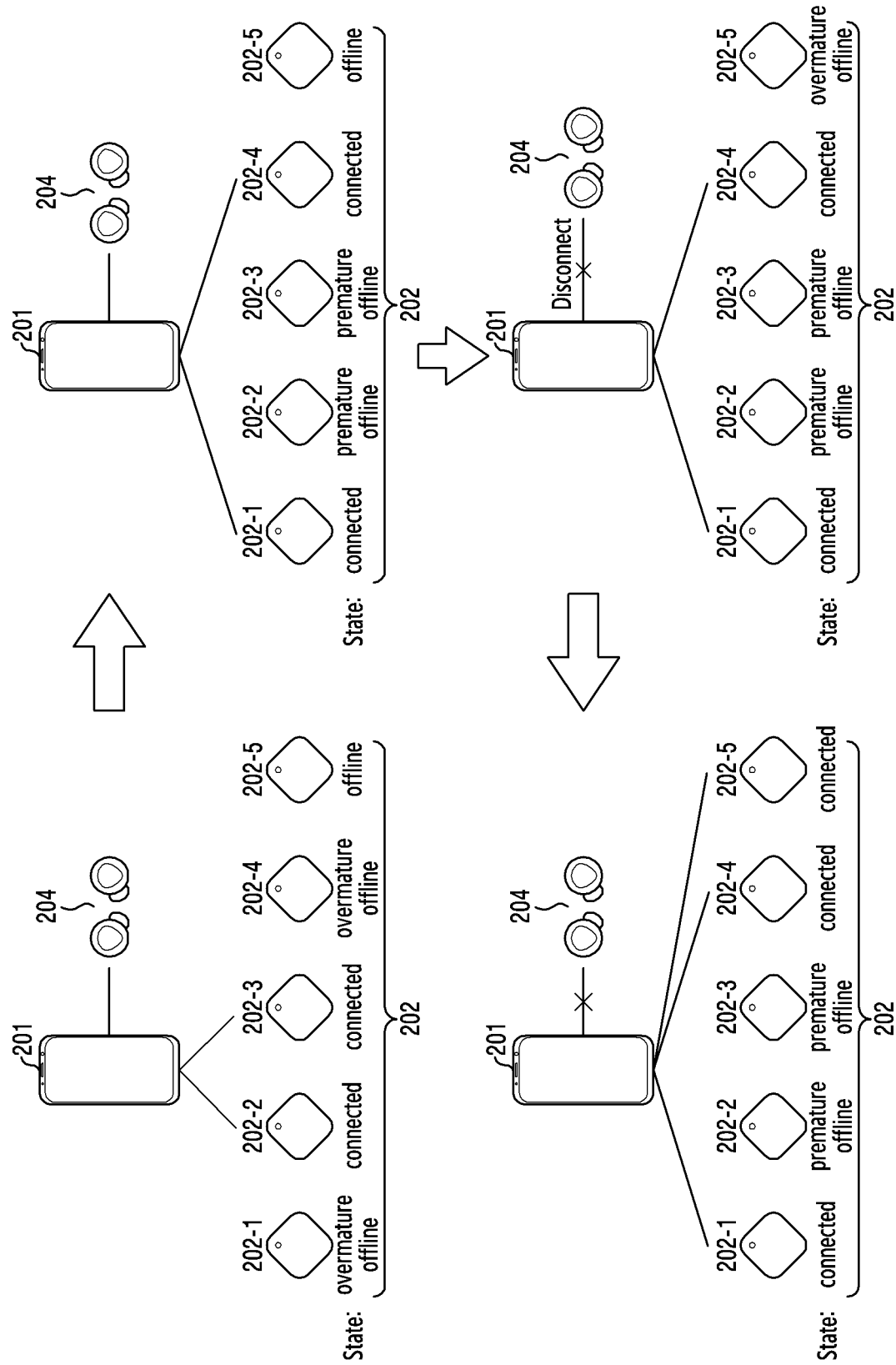
FIG. 11 illustrates a concept diagram for a scheme of managing a wireless network connection by a first device according to an embodiment.

FIG. 11 illustrates a concept diagram for a scheme of managing a wireless network connection by a first device according to an embodiment.

Referring to FIG. 11, the first device 201 may configure a connection with multiple neighboring devices (e.g., the second devices 202 and the fourth devices 204), and transfer control information. In an embodiment, a registration process is required to be preceded so that the multiple devices interwork with the first device 201, and this may be performed like an embodiment illustrated in FIG. 5. According to various embodiments, devices not registered by the first device 201 may be connected to the first device 201 after service authentication.

In FIG. 11, multiple second devices 202-1, 202-2, 202-3, 202-4, and 202-5 may be understood as devices that have already been registered or are to be newly registered with the same user/group account as that of the first device 201. For example, when it is detected that a random second device (e.g., the second device (3) 202-3) has entered within a designated distance, the first device 201 may perform a registration procedure for the second device (3) 202-3 by driving a plugin. As another example, in a case where the second device (3) 202-3 has already been registered in a different electronic device, the first device 201 may perform service authentication for the second device (3) 202-3 via the predetermined server 300, and then at least temporarily configure a connection with the second device (3) 202-3.

In an embodiment, the first device 201 may determine the number of neighboring devices to be connected, in consideration of wireless network connection congestion and system resources. While maintaining a connection with the fourth device 204, the first device 201 may identify information (e.g., the number of paired devices, whether an actual operation is activated, whether data is used, or whether a network function is activated) relating to wireless network usage of the fourth device 204, and determine the number of connectable second devices, based on the identified information. According to various embodiments, in a case where a music is reproduced or a large file is downloaded using the fourth device 204 paired through short-range communication (e.g., Bluetooth), the first device 201 may configure a connection with second devices, the number of which is less than the number of maximum connections allowable in the first device 201. For example, in a case where the number of maximum connections allowable in the first device 201 is 4, and five second devices 202-1, 202-2, 202-3, 202-4, and 202-5 are registered in the first device 201, the first device 201 may configure a channel connection only for two second devices (e.g., the second device (2) 202-2 and the second device (3) 202-3) among the five second devices in consideration of a usage status of using the paired fourth device 204. The second device (2) 202-2 and the second device (3) 202-3 may receive control information through a channel connected to the first device 201. According to various embodiments, the first device 201 may transmit connection state information on neighboring devices to the server 300 every designated time or every time the connection state is changed.

In FIG. 11, in a case where the first device 201 configures a connection with two second devices while reproducing a music through pairing with the fourth devices 204, the second device (2) 202-2 and the second device (3) 202-3 with which the connection is configured may be changed to a connected state. The second device (1) 202-1, the second device (4) 202-4, and the second device (5) 202-5 not connected to the first device 201 among the five second devices 202-1, 202-2, 202-3, 202-4, and 202-5 may be configured to be in an overmature offline state or an offline state. The first device 201 may identify the state of the unconnected three second devices 202-1, 202-4, and 202-5, based on a packet broadcast by the three second devices 202-1, 202-4, and 202-5 according to a designated time period.

In an embodiment, the first device 201 may determine two second devices to be connected, in consideration of the state of the registered second devices 202-1, 202-2, 202-3, 202-4, and 202-5. The state of each of multiple second devices may be changed according to whether same is connected with the first device 201 which is a mother terminal, or a time having passed after disconnection. When entering into an overmature offline state due to passage of a designated time (e.g., 24 hours) after disconnection from the first device 201, the second device 202 may determine that itself has been lost even when there is no actual loss, and unnecessarily broadcast a packet for notifying its existence. In addition, for performance maintenance such as network connection management or security management and a designated control operation related to the second device 202, the first device 201 may be required to perform management so that a predetermined time is not exceeded after the second device 202 has entered into an offline state or an overmature offline state.

In an embodiment, the first device 201 may detect that the second device (1) 202-1 and the second device (4) 202-4 have entered into an overmature offline state. In this case, the first device 201 may release a channel connection with the second device (2) 202-2 and the second device (3) 202-3 having an existing connection, and configure a channel connection with the second device (1) 202-1 and the second device (4) 202-4 being in an overmature offline state. The second device (1) 202-1 and the second device (4) 202-4 for which a channel connection with the first device 201 is configured may be changed to be in a connected state, and the second device (2) 202-2 and the second device (3) 202-3 for which a channel connection with the first device 201 has been released may be changed to be in a premature offline state.

In an embodiment, the first device 201 may terminate pairing with the fourth device 204 and be disconnected therefrom. The first device 201 may determine that an additional channel connection with one second device 202 is possible due to disconnection from the fourth device 204, and may determine a device for which an additional channel connection is to be configured, based on the state of the unconnected three second devices 202-2, 202-3, and 202-5. For example, the first device 201 may identify that the state of the second device (5) 202-5 has been changed from an offline state to an overmature offline state, and may additionally configure a new channel connection with the second device (5) 202-5. The first device 201 and the second device (5) 202-5 for which a new channel connection has been additionally configured may be changed into a connected state. The first device 201 may continuously monitor the state of the unconnected two second devices 202-2, and 202-3, based on a packet broadcast by the three second devices 202-2 and 202-3 according to a designated time period.

Figure 12:
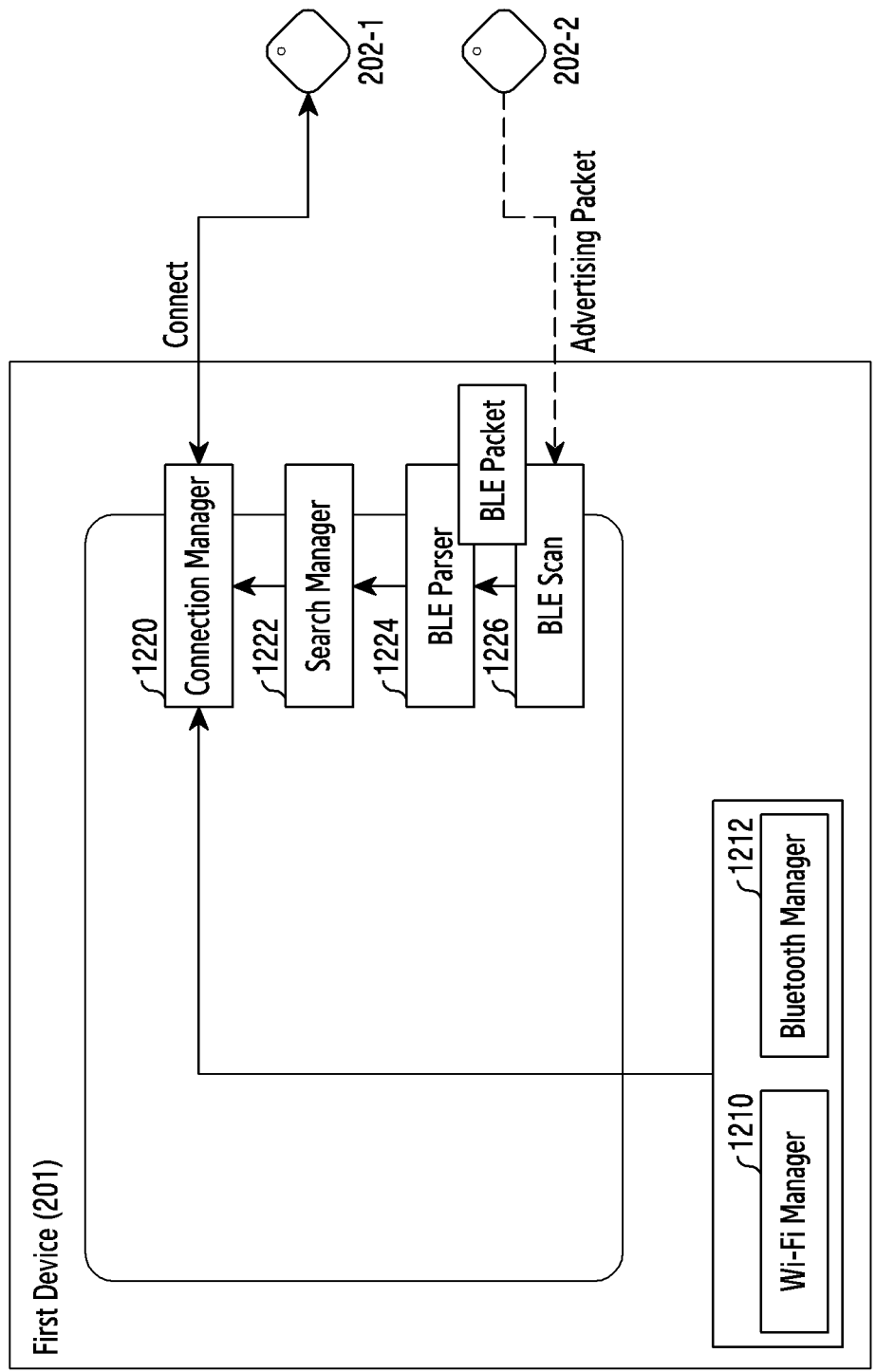
FIG. 12 illustrates wireless network connection management function-related modules of a first device according to an embodiment.

FIG. 12 illustrates wireless network connection management function-related modules of a first device according to an embodiment.

Referring to FIG. 12, the first device 201 may include a framework for supporting a function of managing a wireless network connection with neighboring devices. Functions described with reference in FIG. 12 may be understood as functions supported by the first device 201, and may be implemented to be added to and interwork with the modules of the first device 201 illustrated in FIG. 3.

A function or operation described with reference to FIG. 12 may be understood as a function performed by a processor of the first device 201. The processor may execute commands (e.g., instruction) stored in a memory (e.g., the memory 130 in FIG. 1) to implement a software module illustrated in FIG. 12, and control hardware (e.g., the communication module 190 in FIG. 1) associated with a function.

In an embodiment, a Wi-Fi manager 1210 may manage information relating to a wireless network resource state of the first device 201. For example, the Wi-Fi manager 1210 may measure and continuously monitor items including a data usage amount (e.g., a download or upload packet usage amount) generated in the first device 201, or a network function activation state.

In an embodiment, a Bluetooth manager 1212 may manage information relating to Bluetooth usage of the first device 201. For example, the Bluetooth manager 1212 may continuously monitor items including the number of neighboring devices paired with the first device 201, a connection maintenance state, in-use profile information (e.g., advanced audio distribution profile (A2DP), health device profile (HDP), and headset profile (HSP)), or whether an actual operation is activated.

In an embodiment, when a first event associated with a neighboring external device is detected, a connection manager 1220 may obtain information relating to a wireless network resource state of the first device 201 from the Wi-Fi manager 1210, and obtain information relating to Bluetooth usage of the first device 201 from the Bluetooth manager 1212. The first event may include at least one among connection state change, plugin detection, or a designated operation (e.g., alarm output) performing of external devices located around the first device 201. For example, the first event may be reported from the tracker plugin 220, the alarm management module 246, or the tracker information module 248 illustrated in FIG. 3. The connection manager 1220 may determine wireless connection congestion and system resources of the first device 201, based on the obtained pieces of information, and determine the number of devices connectable from the first device 201 in consideration of a result of the determination. For example, in a case where, in a state where the first device 201 is paired with the third device 203 and the fourth device 204 positioned therearound, the third device 203 is using an HDP profile and the fourth device 204 is maintaining the connection only, only the third device 203 operating by using actual profile information may be determined as being associated with wireless connection management of the first device 201. The connection manager 1220 may determine the number of devices connectable with the first device 201 in consideration of information relating to Bluetooth usage or information relating to a wireless network resource state according to a connection of the third device 203.

In an embodiment, the connection manager 1220 may determine at least one second device for which a channel connection with the first device 201 is to be configured, among one or more second devices discovered around the first device 201. For example, the connection manager 1220 may determine a connection priority, based on state information of each second device discovered as being located within a designated distance from the first device 201. In the priority determination process, when two or more second devices are identified as indicating the same state information, the connection manager 1220 may determine the connection priority in additional consideration of a time point at which each second device is registered in the first device 201, or a subject of the registration. For example, in a case where two or more second devices are identified as indicating the same state information, the connection manager 1220 may preferentially configure a connection for a device for which the first device 201 performs, by itself, a registration procedure (the first device 201 is configured as a mother terminal). As another example, in a case where it is identified that two or more second devices indicate the same state information and both are devices for a direct registration procedure is performed (the first device 201 is configured as a mother terminal), the connection manager 1220 may preferentially configure a connection for the most recently registered device. The connection manager 1220 may determine at least one second device for which a channel connection with the first device 201 is to be configured, based on the determined number of connectable devices and the connection priority.

In an embodiment, a search manager 1222 may search external devices located within a designated distance from the first device 201, and manage state information on each of the discovered external devices. For example, the search manager 1222 may manage, to be in a connected state, an external device for which a channel connection with the first device 201 is currently configured. As another example, the search manager 1222 may manage an external device not connected to the first device 201 to be in a premature offline state, an offline state, or an overmature offline state according to a time having passed after disconnection from the first device 201 that is a mother terminal, and this state information may be identified through analysis of a packet broadcast from each external device.

In an embodiment, a module of BLE scan 1226 may perform scan of packets broadcast from external devices located within a designated distance from the first device 201. For example, the module of BLE scan 1226 may perform scan for the packets according to a first period (e.g., 2 seconds) in a time interval for which a screen (e.g., the display module 160 in FIG. 1) of the first device 201 is turned on, and perform scan for the packets according to a second period (e.g., 3 minutes) longer than the first period in a time interval for which the screen of the first device 201 is turned off.

In an embodiment, a BLE parser 1224 may analyze a message of a packet scanned for via the module of BLE scan 1226. For example, the BLE parser 1224 may obtain state information of the second device 202 from a state field (e.g., the connection state 903 in FIG. 9) included in the scanned packet, and transfer the obtained state information to the search manager 1222.

In an embodiment, the first device 201 may continuously monitor and manage information relating to a connection state of external devices discovered around, and transmit the information to the external server 300 every designated time period or every time the connection state is changed.

Figure 13:
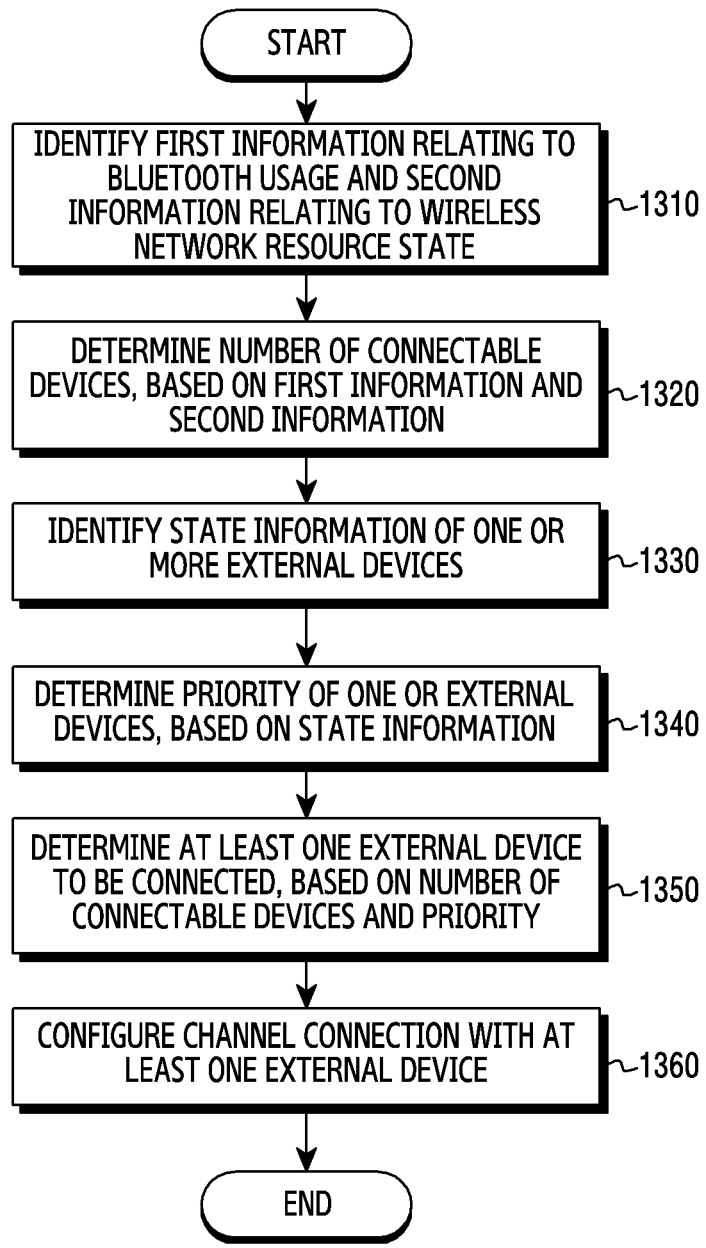
FIG. 13 illustrates a flowchart of an operation of configuring and managing a wireless network connection in a first device according to an embodiment.

FIG. 13 illustrates a flowchart of an operation of configuring and managing a wireless network connection in a first device according to an embodiment.

According to an embodiment, operations performed by the first device 201 described hereinafter may be executed by a processor (e.g., the processor 120 in FIG. 1). According to an embodiment, the operations performed by the first device 201 may be stored in a memory (e.g., the memory 130 in FIG. 1), and may be executed by instructions which, when executed, cause the processor to operate.

Referring to FIG. 13, in operation 1310, the first device 201 may identify first information relating to Bluetooth usage and second information relating to a wireless network resource state. The first information may include at least one among the number of external devices (e.g., the second device 202 to the seventh device 207 in FIG. 2) paired with the first device 201, in-use profile information (e.g., advanced audio distribution profile (A2DP), health device profile (HDP), and headset profile (HSP)), a connection state, or an actual operation activation state. The second information may include at least one among a data usage amount (e.g., a download or upload packet usage amount) measured in the first device 201, or a network function activation state. According to various embodiments, operation 1310 may be performed when a first event is detected, or may be periodically performed every designated time. The first event may include at least one among connection state change, plugin detection, or a designated operation (e.g., alarm output) performing of external devices located around the first device 201.

According to an embodiment, in operation 1320, the first device 201 may determine whether there is a factor actually associated with wireless connection management of the first device 201, based on the first information and the second information, and determine the number of the second devices 202 connectable from the first device 201 according to the determination. For example, in a case where the first device 201 is paired with the third device 203 and the fourth device 204, the first device 201 may determine the third device 203 actually operating by using a HDP profile, as a factor having an impact according to a wireless connection state of the first device 201, or a factor affected thereby, and may determine the number of the connectable second devices 202 in consideration of wireless congestion and system resources of the first device 201 according to an operation of the third device 203. The first device 201 may determine the fourth device 204 actually performing no operations while being paired, as a factor having no impact on wireless connection management of the first device 201, and may not consider an operation relating to the fourth device 204 when determining the number of the connectable second devices 202.

According to an embodiment, in operation 1330, the first device 201 may identify state information of one or more second devices 201 registered in the first device 201. The one or more second devices 201 may be devices which are registered with the same user/group account as that of the first device 201, or are registered by a different electronic device 400, then enter into within a designated distance from the first device 201, and are identified as being in a mutual trustworthy relationship through service authentication. In operation 1330, the first device 201 may identify the state information, based on a state of connection with each second device or a packet received from each second device. For example, in a case where the second device (1) 202-1 among multiple second devices located around the first device 201 maintains a channel connection with the first device 201, the first device 201 may identify the second device (1) 202-1 being in a connected state, based on the channel connection. As another example, in a case where the second device (2) 202-2 among the multiple second devices is not connected to the first device 201, the first device 201 may identify state information of the second device (2) 202-2, based on a packet broadcast from the second device (2) 202-2 every predetermined period. The first device 201 may periodically perform scan for a packet broadcast by unconnected second devices in order to continuously monitor state information on the unconnected second devices. The packet scan period is differently configured according to an on/off state of a display of the first device 201.

According to an embodiment, in operation 1340, the first device 201 may determine a priority of the one or more second devices 201, based on the identified state information. For example, pieces of state information of the second device (1) (202-1), the second device (2) 202-2, and the second device (3) 202-3 among the multiple second devices are identified as a connected state, an overmature offline state, and an offline state, the first device 201 may determine that the priority of the second device (2) 202-2 is highest. When entering into an overmature offline state due to passage of a designated time (e.g., 24 hours) after disconnection from the first device 201 that is a mother terminal, the second device (2) 202-2 may recognize that itself has been lost even when there is no actual loss, and perform a procedure for notifying its location, whereby and unnecessary battery consumption and a communication load may be increased. Therefore, the first device 201 may determine a priority in the order of an overmature offline state, an offline state, and a premature offline state according to state information identified for external devices. If there are two or more second devices having the same state information, the first device 201 may determine the connection priority in additional consideration of a registration subject or a registration time point of each device. For example, when it is identified that the second device (2) 202-2 and the second device (4) 202-4 among the multiple second devices have the same state information, the first device 201 may determine, to have a higher connection priority, the second device (2) 202-2 for which the first device performs a registration procedure by itself (for which the first device 201 is configured as a mother terminal). As another example, when it is identified the second device (2) 202-2 and the second device (4) 202-4 have the same information and the same registration subject, the first device 201 may determine the recently registered device among the two devices to have a higher connection priority.

According to an embodiment, in operation 1350, the first device 201 may determine at least one second device 202 as a device to be connected, based on the determined number of connectable devices and connection priority. For example, in a case where four second devices 202-1, 202-2, 202-3, and 202-4 are registered in the first device 201 and the number of connectable devices are determined as 2, the first device 201 may determine the second device (2) 202-2 and the second device (4) 202-4 as devices to be connected, according to a connection priority determined in consideration of state information of each of the four second devices 202-1, 202-2, 202-3, and 202-4.

According to an embodiment, in operation 1360, the first device 201 may configure a channel connection with the second devices 202-2 and 202-4 determined as devices to be connected. In operation 1360, the first device 201 may manage, in a non-connect scheme, state information of the second devices 202-1 and 202-3 not determined as devices to be connected among the registered second devices 202-1, 202-2, 202-3, and 202-4. For example, the first device 201 may receive, every designated period, a packet broadcast by the second devices 202-1 and 202-3 not determined as the devices to be connected, and continuously monitor state information of each of the second devices 202-1 and 202-3, based on the received packet. According to various embodiments, the first device 201 may transmit connection state information on second devices registered in the first device 201 to the server 300 every designated time or every time the connection state is changed.

Figure 14:
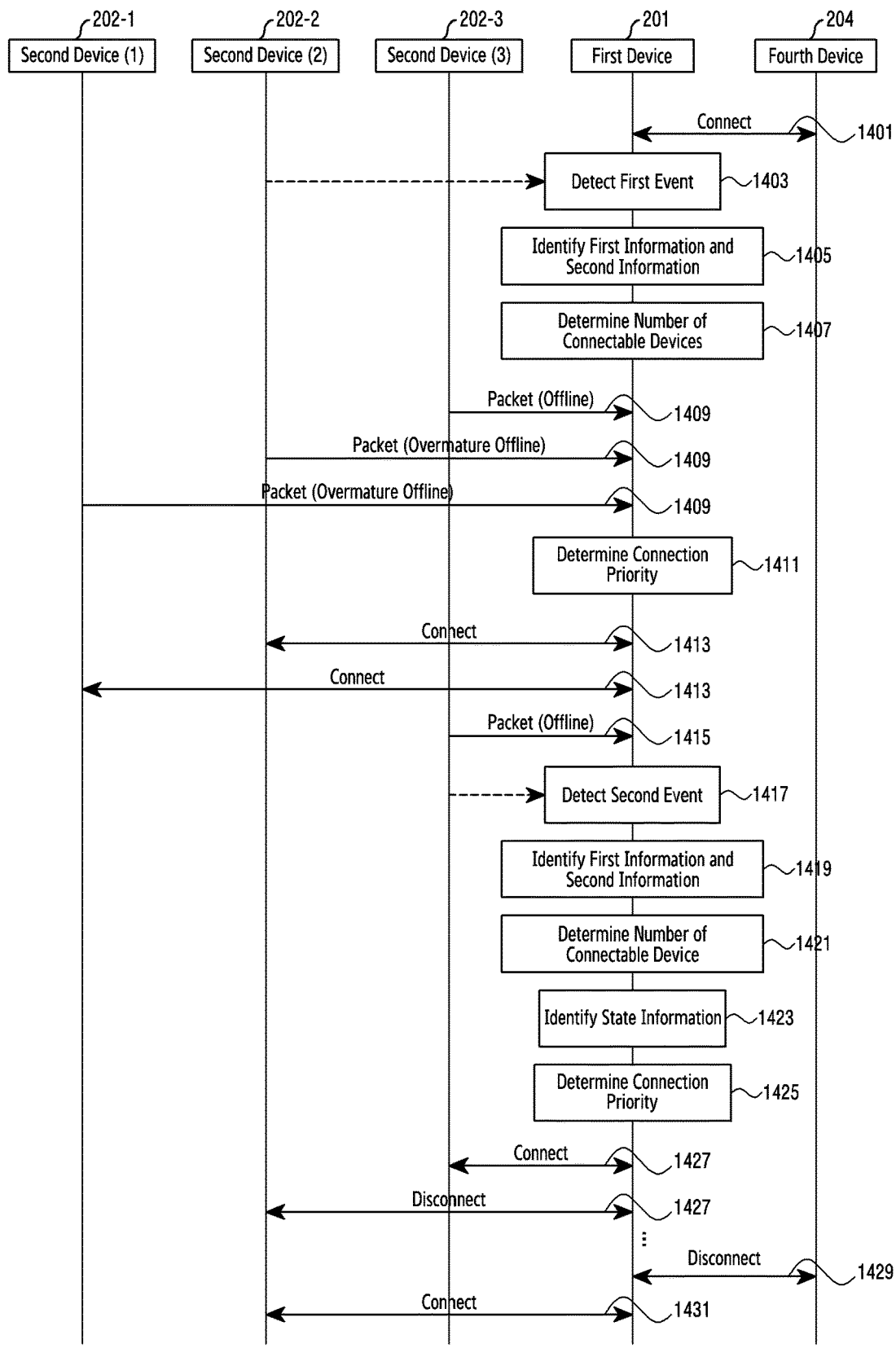
FIG. 14 illustrates a flowchart of configuring and managing a connection to multiple neighboring devices in a first device according to an embodiment.

FIG. 14 illustrates a flowchart of configuring and managing a connection to multiple neighboring devices in a first device according to an embodiment.

Referring to FIG. 14, in operation 1401, the first device 201 may configure a wireless connection with the fourth device 204. For example, the first device 201 may configure pairing with the fourth device 204 by using short-range communication (e.g., Bluetooth). The fourth device 204 may include wireless earphones which are able to reproduce a music file stored in the first device 201 or reproduce a real-time streaming voice signal through pairing with the first device 201.

According to an embodiment, in operation 1403, the first device 201 may detect a first event associated with the second device (2) 202-2 among neighboring external devices. The first event may include at least one among connection state change, plugin detection, or a designated operation (e.g., alarm output) performing of external devices located within a designated distance (e.g., a distance allowing short-range communication) from the first device 201. For example, in a case where the second device (2) 202-2 has entered within a predetermined distance from the first device 201, the first device 202 may detect that the first event has occurred, through plugin detection relating to the second device (2) 202-2.

According to an embodiment, in operation 1405, the first device 201 may identify first information relating to Bluetooth usage and second information relating to a wireless network resource state. For example, the first information may include at least one among the number of external devices (e.g., the second device 202 to the seventh device 207 in FIG. 2) paired with the first device 201, in-use profile information (e.g., advanced audio distribution profile (A2DP), health device profile (HDP), and headset profile (HSP)), a connection state, or an actual operation activation state. The second information may include at least one among a data usage amount (e.g., a download or upload packet usage amount) measured in the first device 201, or a network function activation state.

According to an embodiment, in operation 1407, the first device 201 may determine the number of external devices connectable from the first device 201, based on the identified first information and second information. The first device 201 may determine whether the fourth device 204 currently paired with the first device 201 is actually associated with wireless connection management of the first device 201, based on the first information and the second information. For example, in a case where it is identified that the fourth device 204 is reproducing a music file by using an advanced audio distribution profile (A2DP), it may be predicted that the function of a different external device for which an additional connection with the first device 201 is configured degrades due to an operation of the fourth device 204, or failure may occur in an operation of the fourth device 204 due to additional connection of a different external device. The first device 201 may determine whether there is a factor actually associated with wireless connection management of the first device 201, based on the first information and the second information, and determine the number of the second devices 202 connectable from the first device 201 according to the determination, thereby smoothly configuring a channel connection with a new external device while maintaining the performance of a service being currently provided.

According to an embodiment, in operation 1409, the first device 201 may receive a packet broadcast from multiple second devices 202-1, 202-2, and 202-3 located with a predetermined distance. The multiple second devices 202-1, 202-2, and 202-3 may be devices which are registered with the same user/group account as that of the first device 201, or are registered by a different electronic device 400, then enter into within a designated distance from the first device 201, and are identified as being in a mutual trustworthy relationship through service authentication. According to various embodiments, operation 1409 may be periodically performed every designated time regardless of a time point of performing operation 1401 to operation 1407. The first device 201 may identify state information of each second device, based on a packet received from the multiple second devices 202-1, 202-2, and 202-3. For example, the first device 201 may identify that the second device (1) 202-1 and the second device (2) 202-2 have been entered in an overmature offline state, based on state information of packets broadcast by the second device (1) 202-1 and the second device (2) 202-2. The first device 201 may identify that the second device (3) 202-3 is in an offline state, based on state information of a packet broadcast by the second device (3) 202-3.

According to an embodiment, in operation 1411, the first device 201 may determine a connection priority, based on the identified state information of each second device. For example, the first device 201 may configure a relatively higher connection priority for the second device (1) 202-1 and the second device (2) 202-2 being in an overmature offline state, compared to that of the second device (3) 202-3 among the multiple second devices 202-1, 202-2, and 202-3. According to various embodiments, the first device 201 may determine a connection priority for the second device (1) 202-1 and the second device (2) 202-2 having the same state information in further consideration of a registration subject or a registration time point. For example, when it is identified that a registration procedure for the second device (1) 202-1 among the two devices has been performed by the first device 201 and a registration procedure for the second device (2) 202-2 has been performed by the different electronic device 400, the first device 201 may configure a higher connection priority for the second device (1) 202-1 registered by the first device 201 by itself, compared to the second device (2) 202-2. As another example, when it is identified that the two devices have the same registration subject, the first device 201 may determine the recently registered device among the two devices to have a higher connection priority. According to various embodiments, the first device 201 may determine a device to be connected, based on the determined number of connectable external devices, and the determined connection priorities of the second devices 202-1, 202-2, and 202-3. For example, in a case where the number of connectable external devices are determined as 2 in operation 1407, the first device 201 may determine the second device (1) 202-1 and the second device (2) 202-2 as devices to be connected, based on the connection priorities of the multiple second devices 202-1, 202-2, and 202-3.

According to an embodiment, in operation 1413, the first device 201 may configure a channel connection for each of the second device (1) 202-1 and the second device (2) 202-2 determined as devices to be connected. The first device 201 may interwork with the second device (1) 202-1 and/or the second device (2) 202-2 by transmitting or receiving data to or from the same devices through the connected channels. According to various embodiments, the first device 201 may transmit information relating to the connection state of the multiple second devices 202-1, 202-2, and 202-3 to the server 300 every designated time or every time the connection state is changed.

According to an embodiment, in operation 1415, the first device 201 may receive a packet broadcast from the second device (3) 202-3 not determined as the device to be connected according to a designated time period. The first device 201 may identify that the second device (3) 202-3 is in an offline state, based on state information of the packet broadcast by the second device (3) 202-3.

The first device 201 may continuously monitor state information of the second device (3) 202-3, based on a packet received from the second device (3) 202-3. According to various embodiments, operation 1415 may be periodically performed every designated time after operation 1411 is performed.

According to an embodiment, in operation 1417, the first device 201 may detect a second event associated with the second device (3) 202-3. For example, the first device 201 may identify that state information of the second device (3) 202-3 is changed from an offline state to an overmature offline state, while monitoring the state information of the second device (3) 202-3, and determine that the second event has occurred.

According to an embodiment, in operation 1419, the first device 201 may identify first information relating to Bluetooth usage and second information relating to a wireless network resource state at a time point of occurrence of the second event.

According to an embodiment, in operation 1421, the first device 201 may determine the number of external devices connectable from the first device 201 after occurrence of the second event, based on the identified first information and second information. For example, the first device 201 may identify that there is no particular change factor, by comparing the first information and second information identified at a time point of operation 1419 performed according to detection of the second event with the first information and second information identified at a time point of operation 1405 performed according to detection of the first event, and determine the number of external devices connectable from the first device 201 to be the same as that of operation 1407.

According to an embodiment, in operation 1423, the first device 201 may identify state information of the multiple second devices 202-1, 202-2, and 202-3. For example, the first device 201 may identify state information of the second device (1) 202-1 and the second device (2) 202-2, based on the connected channels, and identify state information of the second device (1) 202-3, based on a packet received according to a designated time period.

According to an embodiment, in operation 1425, the first device 201 may determine a connection priority, based on the identified state information of each second device. For example, the first device 201 may adjust, to be relatively higher, the connection priority of the second device (3) 202-3 having been changed to be in an overmature offline state, and adjust, to be relatively lower, the connection priority of the second device (2) 202-2 among the two devices currently having a channel connection. According to various embodiments, operation 1417 to operation 1425 may be performed in the same way as operation 1403 to operation 1411.

According to an embodiment, in operation 1427, the first device 201 may determine a device to be connected again, based on the adjusted connection priorities. For example, the first device 201 may release a channel connection configured for the second device (2) 202-2, the connection priority of which has been adjusted to be lower in operation 1425, and may configure a new channel connection for the second device (3) 202-3, the connection priority of which has been adjusted to be higher.

According to an embodiment, in operation 1429, the first device 201 may terminate pairing with the fourth device 204 and be disconnected therefrom. The first device 201 may determine to be able to connect an additional channel with one second device due to disconnection from the fourth device 204. A device for which an additional channel connection is to be configured may be determined based on a connection priority configured for each second device. In operation 1431, the first device 201 may configure a channel connection with the second device (2) 202-2 again.

Figure 15:
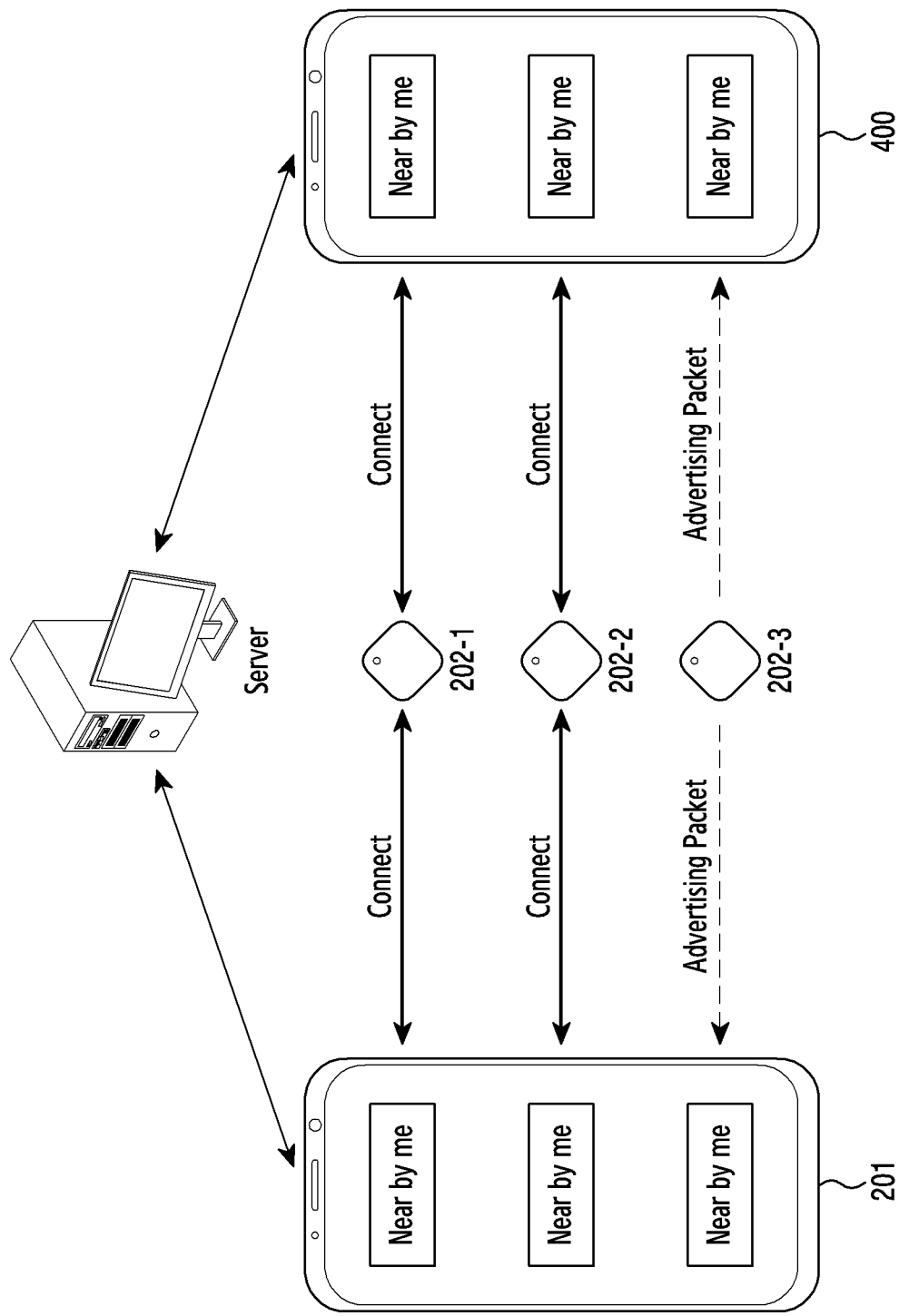
FIG. 15 illustrates a scheme in which a first device manages a connection to multiple second devices according to an embodiment.

FIG. 15 illustrates a scheme in which a first device manages a connection to multiple second devices according to an embodiment.

In FIG. 15, the first device 201 may be understood as a mother terminal which is registered with the same user/group account as that of the multiple second devices 202-1, 202-2, and 202-3, or a device which is registered by the different electronic device 400, then enters into within a designated distance (e.g., a distance allowing short-range communication) from the first device 201, and are identified as being in a mutual trustworthy relationship through predetermined service authentication.

In an embodiment, the first device 201 may determine that a channel connection is possible only with two devices among the multiple second devices 202-1, 202-2, and 202-3, based on information relating to Bluetooth usage and information relating to a wireless network resource state. The first device 201 may determine a connection priority, based on state information of each of the multiple second devices 202-1, 202-2, and 202-3, and may determine two second devices for which a channel connection is to be configured, based on the determined connection priority. For example, the first device 201 may configure a channel connection for each of the second device (1) 202-1 and the second device (2) 202-2, the connection priorities of which are configured to be relatively higher among the multiple second devices 202-1, 202-2, and 202-3. The first device 201 may identify the connection states of the second device (1) 202-1 and/or the second device (2) 202-2 through the connected channels, and transmit or receive control-related data. As another example, the first device 201 may manage state information of the second device (3) 202-3, the connection priority of which is configured to be relatively lower, in a non-connection scheme. The first device 201 may receive an advertising packet broadcast from the second device (3) 202-3 every designated time, and continuously monitor state information of the second device (3) 202-3, based on the received packet.

In an embodiment, each of the second devices 202-1, 202-2, and 202-3 may configure and maintain a connection with multiple electronic devices. According to various embodiments, the second devices 202-1, 202-2, and 202-3 may additionally configure a connection with the electronic device 400 positioned within a predetermined communication enabling distance other than the first device 201 that is a mother terminal. The electronic device 400 may be a device which is identified as being in a mutual trustworthy relationship through predetermined service authentication, or is allowed by the first device 201 to control the second devices 202-1, 202-2, and 202-3, and may determine a device to be connected among the second devices 202-1, 202-2, and 202-3 in the same way as that of the first device 201.

Figure 16:
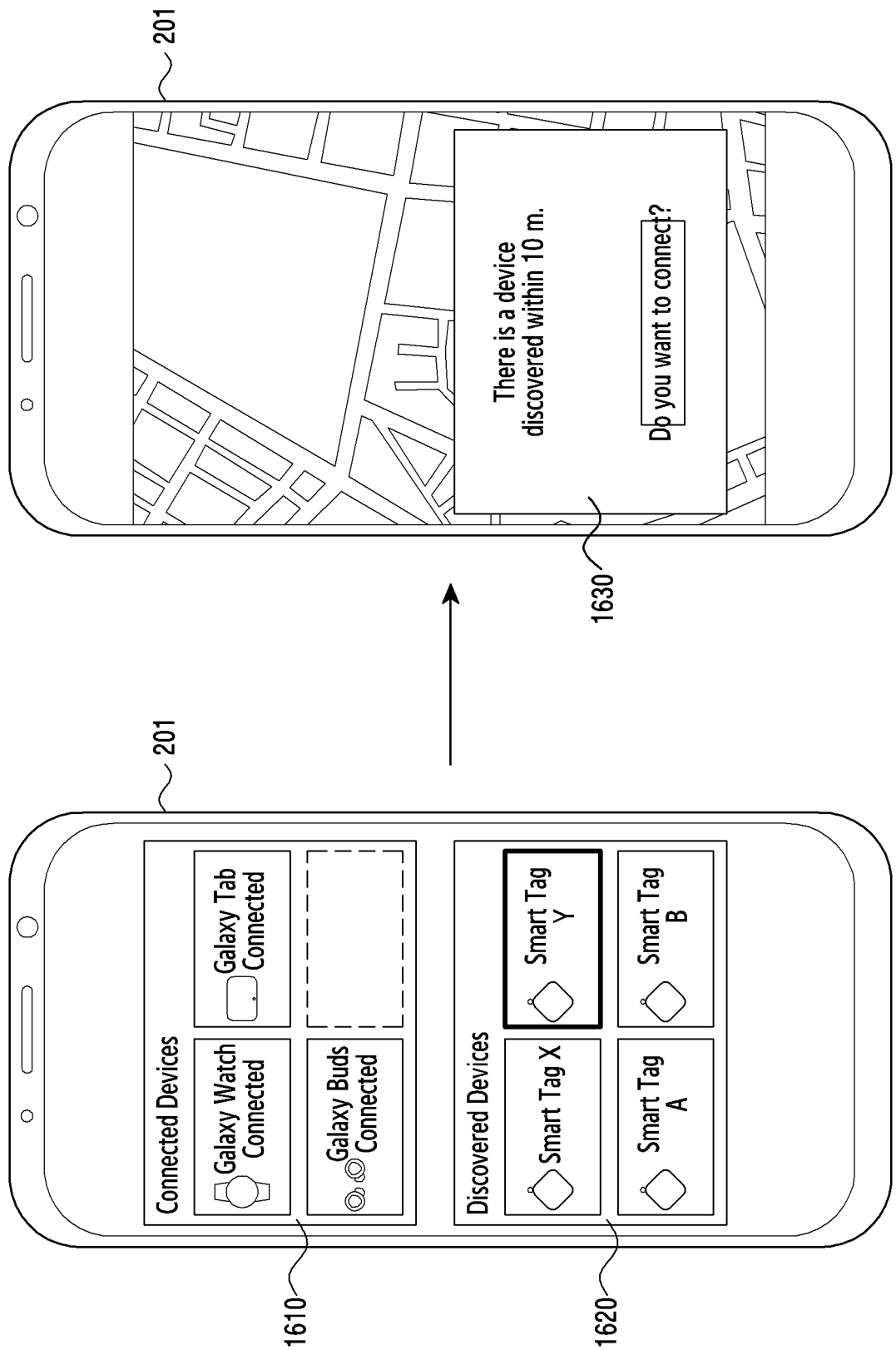
FIG. 16 illustrates a user interface provided when a connection with a neighboring device is configured in a first device according to an embodiment.

FIG. 16 illustrates a user interface provided when a connection with a neighboring device is configured in a first device according to an embodiment.

In FIG. 16, the first device 201 may configure a connection with multiple external devices located therearound. Referring to FIG. 16, the first device 201 may display, on a display, a list 1610 of connected devices and a list 1620 of discovered devices among multiple external devices.

In an embodiment, the list 1610 of the connected devices may indicate a set of devices for which a current channel connection is configured, among devices which are registered in the first device 201 and thus configured to have the first device 201 as a mother terminal. According to various embodiments, the first device 201 may determine the number of devices included in the list 1610 of the connected devices, based on information relating to a Bluetooth usage status of the first device and information relating to a wireless network resource state. The first device 201 may manage connection state information of the devices included in the list 1610 of the connected devices, based on a channel connection configured for each the devices.

In an embodiment, the list 1620 of the discovered devices may indicate a set of devices discovered as being located within a predetermined distance from the first device 201. According to various embodiments, the first device 201 may receive an advertising packet broadcast according to a designated time period from devices included in the list 1620 of the discovered devices, and identify state information of the devices, based on the received advertising packet.

In an embodiment, in a case where a user of the first device 201 is to control a designated operation (e.g., alarm output) for smart tag Y among the discovered devices, the first device 201 may obtain a user input of selecting smart tag Y in the list 1620 of the discovered devices, and display a message window 1630 for configuration of connection with smart tag Y. According to various embodiments, the first device 201 may determine whether an additional connection configuration for smart tag Y is possible, based on information relating to a Bluetooth usage status of the first device and information relating to a wireless network resource state. When a result of the determination indicates that the additional connection configuration is possible, the first device 201 may directly configure a connection for smart tag Y without disconnecting from existing connected devices. When a result of the determination indicates that the additional connection configuration is not possible, the first device 201 may disconnect from at least one device, based on the priorities of existing connected devices included in the list 1610 of the connected devices, and then configure a new channel connection for smart tag Y.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication circuit;
at least one processor; and
memory storing instructions which, when executed by the at least one processor, cause the electronic device to:
based on detection of a first event associated with an external device, identify first information relating to Bluetooth usage of the electronic device and second information relating to a wireless network resource state, the first information including at least one of a number of external devices connected with the electronic device, in-use profile information, a connection state, or an actual activation state;
determine a number of connectable devices, based on the first information and the second information;
identify state information of one or more external devices registered in the electronic device;
determine a priority of the one or more external devices, based on the state information;
determine at least one external device, from among the one or more external devices, as a device to be connected, based on the number of connectable devices and the priority; and
control the communication circuit to connect a channel with the at least one external device determined as the device to be connected.

2. The electronic device of claim 1, wherein the instructions, when executed by the at least one processor, further cause the electronic device to:
control the communication circuit to transmit control information on the at least one external device through the connected channel; and
control the communication circuit to transmit connection state information on the one or more external devices to a server according to a designated time period.

3. The electronic device of claim 1,
wherein the second information comprises at least one of a data usage amount measured in the electronic device, or a network function activation state.

4. The electronic device of claim 1, wherein the first event comprises at least one of state change, plugin detection, or a designated operation performing of the external device.

5. The electronic device of claim 1, wherein the instructions, when executed by the at least one processor, further cause the electronic device to register the one or more external devices, based on at least one of a connection request received in the electronic device or a packet received every designated period.

6. The electronic device of claim 5, further comprising a display,
wherein the instructions, when executed by the at least one one processor, further cause the electronic device to:
scan for a packet broadcast from the external device according to a first period while the display is turned on; and
scan for a packet broadcast from the external device according to a second period while the display is turned off, and
wherein the first period is a time unit that is smaller than the second period.

7. The electronic device of claim 1, wherein the instructions, when executed by the at least one processor, further cause the electronic device to, based on the state information of the one or more external devices being identical, determine the priority, based on at least one of a subject of registration in the electronic device or a registration time point.

8. The electronic device of claim 1, wherein the instructions, when executed by the at least one processor, further cause the electronic device to receive, every designated period, a packet broadcast from an external device that is not determined as the device to be connected among the one or more external devices, and monitor state information of the external device that is not determined as the device to be connected, based on the received packet.

9. An operation method of an electronic device, the operation method comprising:
  based on detection of a first event associated with an external device, identifying first information relating to Bluetooth usage of the electronic device and second information relating to a wireless network resource state, the first information including at least one of a number of external devices connected with the electronic device, in-use profile information, a connection state, or an actual operation activation state;
  determining a number of connectable devices, based on the first information and the second information;
  identifying state information of one or more external devices registered in the electronic device;
  determining a priority of the one or more external devices, based on the state information;
  determining at least one external device, from among the one or more external devices, as a device to be connected, based on the number of connectable devices and the priority; and
  connecting a channel with the at least one external device determined as the device to be connected.

10. The operation method of claim 9, further comprising:
  transmitting control information on the at least one external device through the connected channel; and
  transmitting connection state information on the one or more external devices to a server according to a designated time period.

11. The operation method of claim 9, wherein the first event comprises at least one of state change, plugin detection, or a designated operation performing of the external device, and
  wherein the second information comprises at least one of a data usage amount measured in the electronic device, or a network function activation state.

12. The operation method of claim 11, further comprising:
  receiving, every designated period, a packet broadcast from an external device that is not determined as the device to be connected among the one or more external devices; and
  monitoring state information of the external device that is not determined as the device to be connected, based on the received packet.

13. The operation method of claim 9, wherein the identifying the state information of the one or more external devices registered in the electronic device comprises registering the one or more external devices, based on at least one of a connection request received in the electronic device or a packet received every designated period.

14. The operation method of claim 13, further comprising:
  scanning for a packet broadcast from the external device according to a first period while a display of the electronic device is turned on; and
  scanning for a packet broadcast from the external device according to a second period that is a time unit greater than the first period, while the display is turned off.

15. The operation method of claim 9, wherein the determining the priority of the one or more external devices comprises, based on the state information of the one or more external devices being identical, determining the priority, based on at least one of a subject of registration in the electronic device or a registration time point.

* * * * *